United States Patent [19]

Gray

[11] 3,921,212

[45] Nov. 18, 1975

[54] READ CIRCUIT AND PROCESS FOR READING MULTI-TRACK RECORDED INFORMATION WITH PARTIAL TIME MULTIPLEXING

[75] Inventor: Martin D. Gray, Sierra Madre, Calif.

[73] Assignee: C. J. Kennedy Company, Altadena, Calif.

[22] Filed: Dec. 2, 1974

[21] Appl. No.: 528,808

[52] U.S. Cl. .............................................. 360/51
[51] Int. Cl. .............................................. G11b 5/02
[58] Field of Search .................... 360/39, 40, 42, 51

[56] References Cited

UNITED STATES PATENTS

| | | | |
|---|---|---|---|
| 3,702,996 | 11/1972 | Wolfer et al. | 360/51 |
| 3,755,798 | 8/1973 | Aguirre | 360/51 |
| 3,778,793 | 12/1973 | Hayashi et al. | 360/51 |
| 3,864,735 | 2/1975 | Davis et al. | 360/51 |

*Primary Examiner*—Vincent P. Canney
*Attorney, Agent, or Firm*—Fraser and Bogucki

[57] ABSTRACT

A read circuit for reading multi-track information from a recording medium such as magnetic tape includes a plurality of information gathering subsystems, each connected to receive information indicative of a different track of recorded data and a single time multiplexing information processing subsystem connected to periodically and sequentially sample outputs from the information gathering subsystems, process the gathered information to determine the data content thereof, and output the determined data information simultaneously for all tracks in parallel. Each information gathering subsystem operates to sample an output signal from an associated track at a relatively high sampling rate and provide information indicative of current information state, the occurrence of an information state transition, and the time since a latest information state transition Data alignment and error detection and correction circuitry within the information processing subsystem sequentially samples these indications to reconstruct the data information. A deskewing circuit within the information processing subsystem also operates on a multiplex basis and advantageously utilizes the recording format of phase encoded data to receive multi-channel data information on a non-synchronized multiplex basis and assemble data for simultaneous, parallel output for all tracks. The combination of separate data gathering subsystems and a time multiplexing data processing subsystem permits both highly accurate detection of recorded information and sophisticated processing for data and error detection without excessive cost.

33 Claims, 8 Drawing Figures

READ CIRCUIT AND PROCESS FOR READING MULTI-TRACK RECORDED INFORMATION WITH PARTIAL TIME MULTIPLEXING

BACKGROUND OF THE INVENTION

1. Field of the Invention

This invention relates to data electronics for magnetic tape transports and more particularly to partially time multiplexing electronics for reading information recorded in a phase encoded format.

2. Description of the Prior Art

Data information may be recorded on a multi-track recording medium such as magnetic tape in any one of a variety of standard formats. These include return to zero formats (RZ), non return to zero formats (NRZ and NRZI), and phase encoding (PE). Of these formats, phase encoding is most readily used in conjunction with the present invention.

The assembly format for phase encoding requires that information be recorded in separate information blocks with the data presented in a data block which is symmetrically bounded by a preamble and a postamble. The preamble must contain at least 40 zeros on all tracks followed by a one while the postamble must contain a one on all tracks followed by at least 40 zeros on all tracks. This symmetry of the preamble and postamble insures that the data may be read in both the forward and reverse directions.

The recording format establishes periodic recording intervals for data frames with a data transition occurring at the boundary between each successive pair of adjacent data frames. One edge of the magnetic tape is established as a reference edge and a zero is defined as saturation toward the reference edge while a one is defined as a saturation away from the reference edge. A string of alternate ones and zeros on a given recording track is represented by recording transitions at the boundaries between the data frames. However, if two successive zeros or two successive ones are to be recorded, a phase information transition having an opposite information state from the data state must occur midway along a data frame interval in order to permit the transition at the end of the data frame interval to indicate the proper data state. The nominal density of the data frames is established at 1600 data frames or bits per inch with information transitions occurring at either 1600 or 3200 transitions per inch, depending upon whether phase transitions are required at the center of a data frame to properly represent recorded data information.

Extremely detailed tolerances have been established for the recording of phase encoded information. These are set forth in American National Standards Institute Standards for Recorded Magnetic Tape for Information Interchange (1600 CPI, Phase Encoded). Ideally, each data information flux transition would be separated by exactly one sixteen-hundredth inch and each phase information transition would occur at the exact center of a data frame. However, variations in tape recorder operating speeds, bit crowding effects and other phenomena prevent these ideal nominal conditions from being achieved. Standard tolerances have therefore been established to limit the deviations from the nominal recording conditions. While these spacing tolerances for information transitions are somewhat complicated, a data transition must occur on tape between approximately 72% and 129% of a nominal data frame interval. If ideal speed corrections are assumed for the transport which is reading tape the limits are improved to between 85% and 112% of a data frame interval. Without speed correction, intermediate phase transitions must occur between 37% and 71% of a data interval. With ideal speed correction the phase transitions must occur between 44% and 62% with speed correction. However, the ideal conditions can never be reached because of a lack of ideal speed corrections and errors induced by imperfections in commercially practical read circuitry and mechanical tape handling equipment. With ideal speed correction and a perfect machine a percentage variation of 85% − 62% = 23% occurs between the latest flux transition and the earliest data transition. With additional errors generated by the read circuitry accounted for, a sampling rate of at least 12 to 25 samples per data frame interval is required to accurately read data with a sampling system.

A magnetic tape transport operating at 45 inches per second receives phase encoded data on each channel at a rate of 72,000 data frames per second. If each channel were sampled at a rate of 12 times per data frame it would then be necessary to sample at a rate of 865,000 times per second for each track and, accounting for nine tracks, it would be necessary to sample data, process data and dispose of data at a rate of 7.8M times per second. This is not practical with $T^2L$ technology. Furthermore, if a fixed demarcation point between phase information transitions and data information transitions is established to permit use of less complex circuitry, the required sampling rate becomes even greater.

Because of the tremendously high data rates that are involved, conventional phase encoded read circuitry for magnetic tape transports employs separate read electronic channels for each track of recorded information. Each channel is substantially identical and requires data and error detection circuitry as well as a complex analog phase lock loop or a similar digital speed correction. Because marginal deviations from the expected norm are difficult to detect, these circuits are difficult to trouble shoot. Furthermore, each channel must store several bits of detected information to permit proper deskewing and circuitry must be provided to separate the actual data from the preamble and postamble. Thus, while phase encoding permits a high density recording format, the data electronics required for reading such information has heretofore been quite complex and expensive to implement.

SUMMARY OF THE INVENTION

A partial time multiplex system in accordance with the invention for reading multi-channel parallel recorded information includes a plurality of data gathering subsystems, each connected to gather recorded information from a different channel and a data processing subsystem connected to periodically and sequentially sample outputs from each of the data gathering subsystems, detect data information, detect error conditions, and assemble detected data information for simultaneous parallel output. The data gathering subsystems respond to recorded information provided by a read head transducer to indicate a current information state, the occurrence of a transition, and the time since the occurrence of the latest transition. The information processing subsystem operates on a time multiplex basis to periodically sample the indications from each of the data gathering subsystems to separate data information transitions from phase information transitions and detect error conditions. The data processing subsystem also includes deskew circuitry which interrogates each channel of recorded track information on a time multiplex basis to receive data information as it is generated by the detection circuitry and output data information for all channels simultaneously in parallel. A master clock signal generator which is responsive to a single track of recorded information generates a master clock time base signal for the entire system which is adjusted in accordance with the frequency of data information which is received by the single channel. Because the master clock signal determines a time base rather than individual information transition times for each channel, separate phase locked clock generators are not required for each channel. The deskewing circuit includes a quadrature dual direction shifting storage which stores a plurality of data information bits for each channel. A one bit which always precedes a block of data information is utilized as an index bit for each channel with data information being continually, unidirectionally shifted in at one end and output from a storage position immediately in front of the index bit when the locations of the index bits within the shifting storage indicate that data information is available for outputting on all channels.

BRIEF DESCRIPTION OF THE DRAWINGS

A better understanding of the invention may be had from a consideration of the following detailed description taken in conjunction with the accompanying drawings in which.

DETAILED DESCRIPTION

Figure 1:
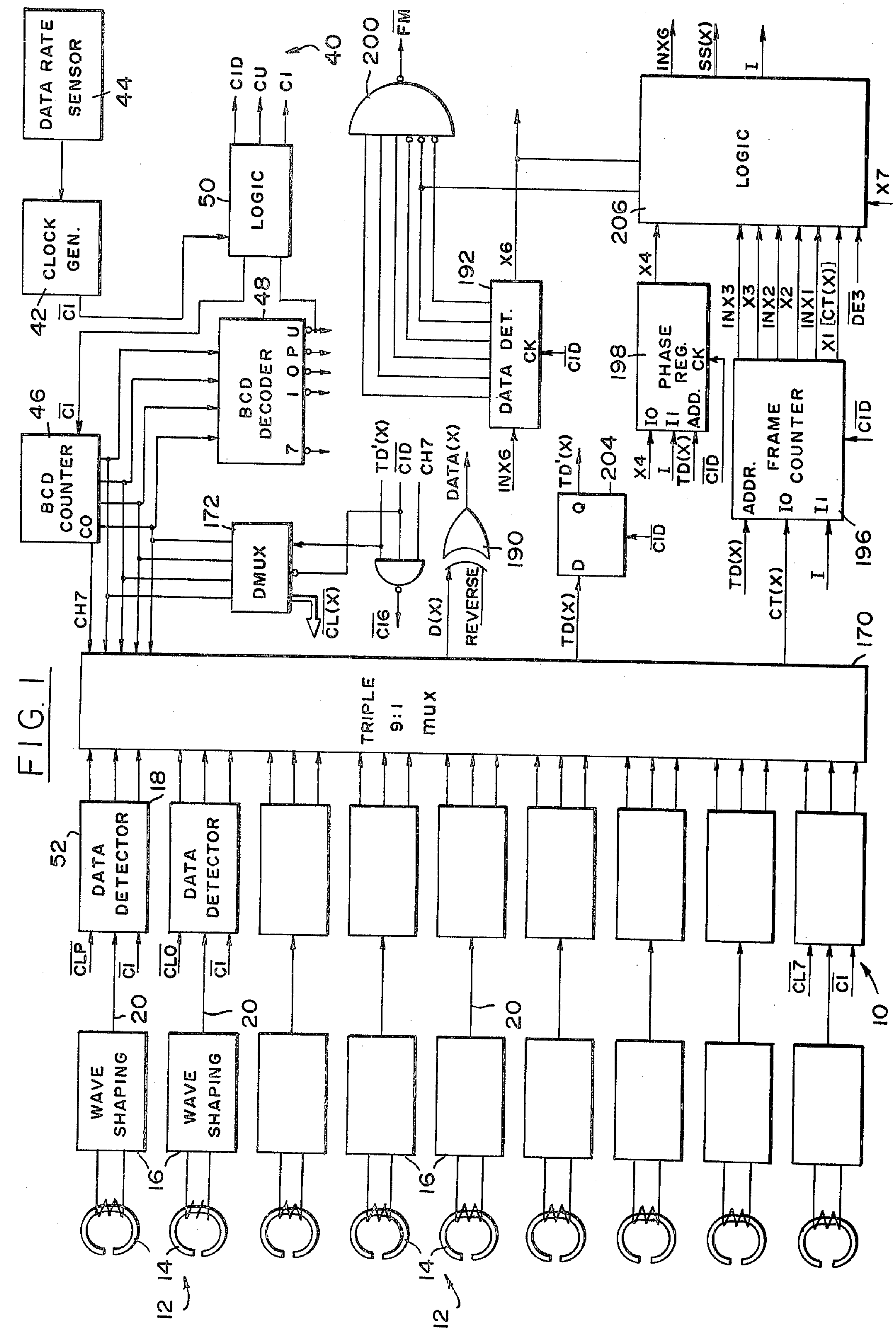
FIG. 1 is a schematic and block diagram representation of a portion of a partial time multiplexing data detection circuit in accordance with the invention.

As shown in FIGS. 1*a* and 1*b*, a partially multiplexing system 10 for reading phase encoded data in accordance with the invention includes nine data gathering channels 12 each including a read head transducer 14 for reading a different track of recorded information, wave shaping circuitry 16, and a data detector 18. As a track of magnetic tape having information recorded thereon in a phase encoded format passes beneath a read head transducer 14, flux reversals or transitions in the track cause the transducer 14 to generate an electric voltage signal which is communicated to a wave shaping circuit 16. The wave shaping circuit amplifies and squares the voltage signal from the transducer head 14 to generate a data signal 20 substantially as shown in curve A of FIG. 2. In the phase encoding format, a track of recorded information is longitudinally divided into data frames at a density of 1600 data frames per inch. A transition must occur at each boundary between a pair of adjacent data frames. The polarity of the transition indicates either a 1 or a 0 information bit. At the center of a data frame interval, a phase transition may or may not occur, depending on whether the phase transition is necessary to permit the proper transition polarity at the next boundary between two adjacent data frames. As shown in curve A of FIG. 2, a first data frame 22 begins with a 0 as indicated by a high to low transition as a phase transition at the center and ends with a logic 0. A second data frame interval follows the same format and a third data frame interval 26 begins with a 0 and ends with a 1. A fourth data frame interval 28 begins with a 1 as a phase transition at the center thereof and ends with a 1. It will be noted that a phase transition is required between two adjacent bits of the same polarity type but that where the indicated information changes from 0 to 1 or from 1 to 0 no intermediate phase transition is required.

Circuitry to be described below divides each data frame interval into five quarter frame intervals as representatively indicated for data frame interval 22. Each data frame interval begins with a data transition such as 0 transition 30 and ends with either a subsequent data transition such as 0 transition 32 or an indication that 5/4 of a nominal data frame interval time have elapsed. The system 10 tests for a phase transition between the nominal 1/4 and 3/4 frame interval times indicated by F/4 and 3F/4 respectively. The system 10 also tests for a data transition between the 3/4 and 5/4 frame interval times as indicated by 3F/4 and 5F/4 respectively. If a required phase information transition or data information transition does not occur within the respective nominal data frame interval time periods, an error condition is indicated for a particular channel. A data frame interval timing mechanism is resynchronized at the 0 point for every data information transition and resynchronized at the 2F/4 point for each phase information transition.

A clock generating subsystem 40 includes a clock generator 42 which is responsive to a data rate sensor 44, a BCD counter 46 which counts clock pulses Cl provided by clock generator 42 and a BCD decoder 48 and a logic network 50. Data rate sensor 44 senses the rate at which data transitions are actually being detected on one track of the recording medium and controls the rate of the clock generator 42 to correct for long term variations in the data rate to provide a master clock signal Cl having 64 clock pulses for each nominal data frame interval. For a tape transport operating at 25 ips, Cl has a frequency of 2.56 MHz. Multiplexing control is provided by BCD counter 46 and BCD decoder 48. Counter 46 operates in conjunction with the decoder to divide the clock pulses Cl into groups of 10 periodic, sequential clock pulse periods to control time multiplexing. The 10 outputs of BCD decoder 48 indicate the current multiplex data period. An update output from a terminal labeled U identifies the beginning of a multiplex sequence and defines a clock time interval during which the data read system 10 may perform system functions. A parity clock pulse interval defined by the P output of decoder 48 defines an interval during which information from the parity track of a recording medium is processed. Sequentially successive outputs 0–7 define clock pulse periods during which information on data tacks 0–7 are processed by channels 0–7 of the data read system 10 respectively. Logic 50 responds to the master clock signal Cl and the update signal to develop a clock input data signal, CID, and a clock update signal, CU. Signal CID is generated simultaneously with pulses on Cl except during the update time as defined by the update signal and clock signal CU pulses are generated simultaneously with Cl pulses during update times. These signals are illustrated in curves B through H in FIG. 2 (on a different time scale from curve A). Curve B indicates the master clock pulses Cl while curves C through F illustrate the multiplexing time periods for update, channel P, channel 0 and channel 7. Multiplexing clock periods for channels 1–6 have not been illustrated, but it will be appreciated that they are generated sequentially between clock pulse period 0 and clock pulse period 7 in the manner illustrated by curves C, D, E and F. Curve G illustrates the CID signal which is substantially identical to the Cl signal except that no clock pulse occurs while the update signal is true. Similarly, curve H represents the CU signal which contains a clock pulse simultaneously with the master clock signal Cl only when the update signal is true. The CID signal is thus used as a synchronous clock for multiplexed data processing functions while the CU signal is utilized to clock update functions.

The data detectors 18 are thus sampled at a rate of 256 KHz and this would normally permit a resolution of elapsed time between transitions of no more than 1/25600 or 3.9 microsec. This would be only 1/6.4 of a data frame interval. However, digital timing information provided by a data detector 18 each time it is sampled permits the time at which an information transition occurs to be determined with a much better resolution.

Figure 3:
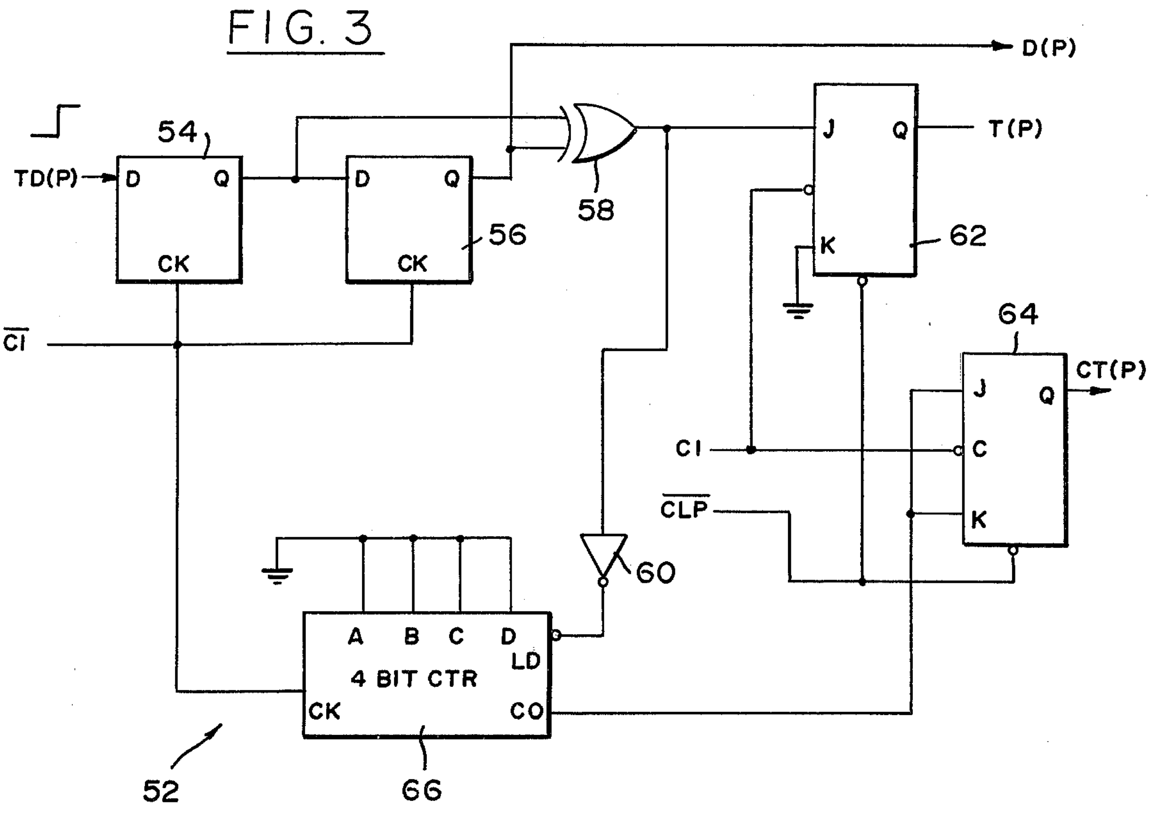
FIG. 3 is a schematic and block diagram representation of a data detector circuit which is shown in block form in FIG. 1.

The data detectors 18 are representatively illustrated in detail in FIG. 3 which shows the data detector 52 for the parity channel. Data detector 52 includes a pair of D input synchronous flip-flops 54, 56, an Exclusive-OR gate 58, an inverter 60, a pair of JK synchronous flip-flops 62, 64 and a four bit binary counter 66. To understand the operation of the data detector 52 assume that a transducer head signal for the parity channel TD(P) is initially low and has been low for at least 1/4 of a data frame interval period. Flip-flops 54, 56 and 62 are at a logic 0 state, flip-flop 64 is at a logic 1 state and counter 66 is counting. Assume now that a low to high transition in signal TD(P) occurs. At the next low to high transition of clock signal $\overline{Cl}$ flip-flop 54 is set and at the following transition of clock signal $\overline{Cl}$ flip-flop 56 is set. During the intervening interval between the setting of flip-flop 54 and flip-flop 56, Exclusive-OR gate 58 generates an output pulse. This pulse enables the J input to flip-flop 62 which causes flip-flop 62 to become set simultaneously with the setting of flip-flop 56. The pulse output from Exclusive-OR gate 58 is also communicated through an inverter 60 to cause the loading of zeros into all four bit positions of counter 66. In other words, counter 66 is reset. The output pulse from Exclusive-OR gate 58 disappears with the second occurrence of clock pulse $\overline{Cl}$ after the transition and counter 66 begins counting with the third occurrence of clock pulse $\overline{Cl}$ after the transition.

Since there are 64 master clock pulses during each data frame interval, and since counter 66 overflows at count 16, the carry output signal from counter 66 indicates the end of a data frame interval quarter. This carry output pulse is connected to toggle flip-flop 64 which is reset by a clear parity channel pulse CLP prior to the time that counter 66 overflows after a transition. The output CT(P) from flip-flop 64 thus indicates whether an even or an odd number of quarter data frame intervals have elapsed subsequent to a latest information transition. Multiplexing circuitry contains additional counters to keep track of whether 1, 2, 3, 4, or 5 quarters have elapsed since a preceding transition and sample the output of flip-flop 64 sufficiently often to insure that no information is lost. During the next multiplex sampling time for the parity channel after the occurrence of a parity transition, the transition parity signal T(P) generated by the Q output of flip-flop 62 causes data processing circuitry to determine the quarter in which the transition occurred, determine whether the transition was a phase information transition or a data information transition, and determine whether or not the transition was of an acceptable polarity in view of preceding information transitions. The detection circuit 52 does not itself in any way recognize a distinction between a data transition and a phase transition. Whenever a transition signal, T(X) [specifically T(P) for the parity channel], is detected during a multiplex sampling interval, a clear pulse is generated during the sampling interval for the immediately subsequent channel. For example, after a transition signal T(P) is detected for the parity channel, the clear pulse, $\overline{CLP}$ is generated during the next clock pulse period while information for channel 0 is being sampled. This delay of one clock pulse period insures that the flip-flops 62 and 64 are reset as soon as possible to prevent the loss of information without interfering with the sampling of information during a channel sampling interval. On the other hand, the counter 66 is reset directly in response to a transition and thus is synchronized with the actual transitions on the channel irrespective of the time at which the multiplexing information sampling occurs. Flip-flop 64 is then resynchronized with counter 66 as soon as the information is taken therefrom.

During a multiplex sampling interval, three separate information signals are sampled. A date signal D(P) generated by the Q output of flip-flop 56 indicates the current data information state, the T(P) signal generated by the Q output of flip-flop 62 indicates the occurrence of a transition since the last sampling interval, and the count pulse signal, CT(P) generated by the Q output of flip-flop 64 permits transitions in flip-flop 64 to be detected for the purpose of counting quarter data frame interval periods. Because the data detectors 18 are synchronous systems which operate in response to the master clock pulse signal Cl, they are in effect high speed sample data systems which sample the transducer head data signals TD(X) 64 times during each nominal data frame interval.

For the purpose of multiplexing, the master clock signals Cl are divided into ten sequential multiplexing intervals. The time multiplex sampling of the outputs from the data detectors thus occurs at 1/10 the high speed sampling rate of the data detectors themselves or at an average of 6.4 sample intervals per data frame interval. Because of the counter 66 and flip-flop 64 the relatively slow multiplexing rate is sufficient to insure that information cannot be lost from a data detector. In the present example, since counter 66 counts quarter data frame intervals, it is sufficient that the multiplexing information sampling occur at the rate of at least four times per data frame. As noted, the actual sampling rate is somewhat faster and occurs at an average of 6.4 times per data frame.

Figure 4:
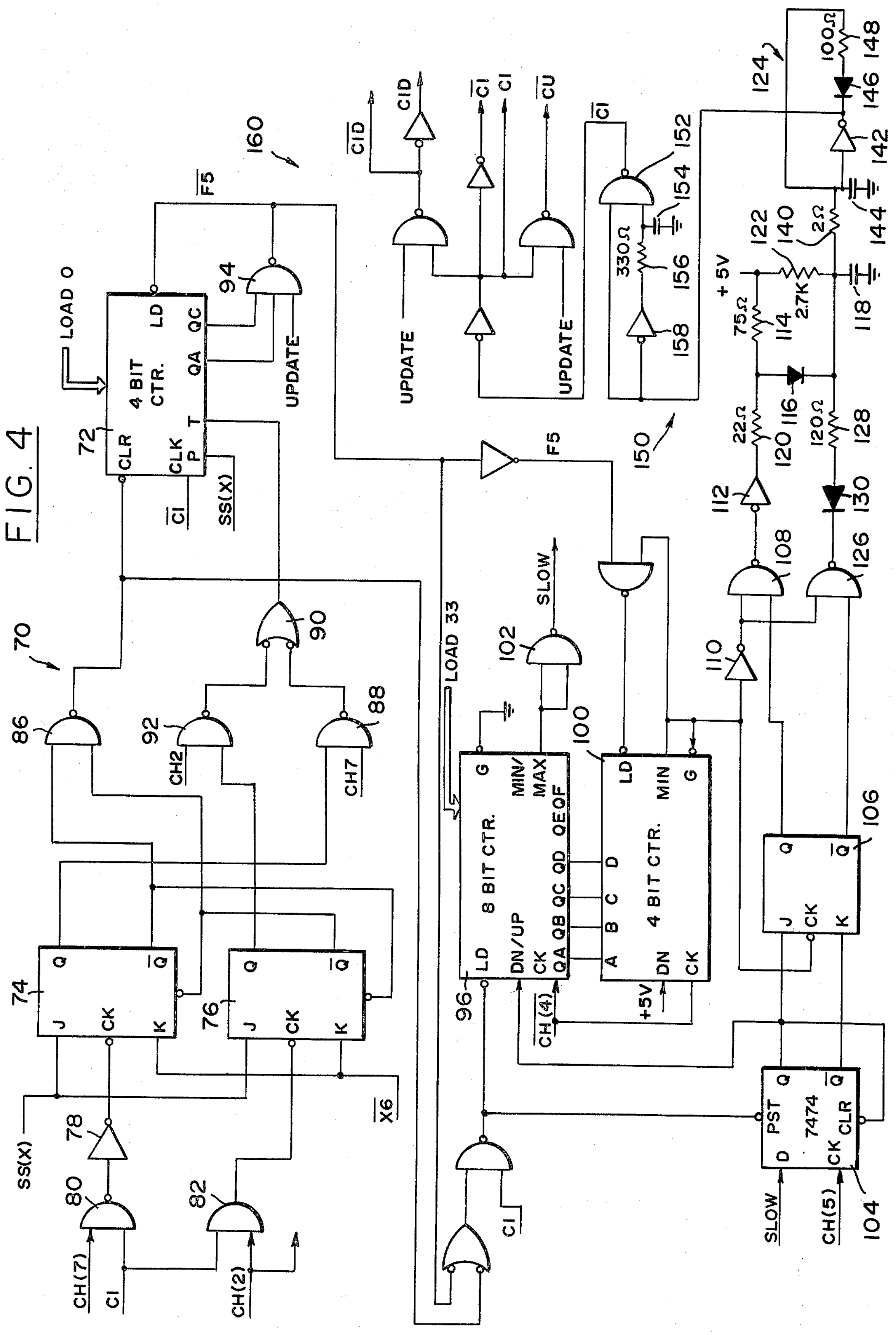
FIG. 4 is a schematic representation of a portion of the data detection circuit in accordance with the invention.

The clock generator 42, data rate sensor 44 and logic 50 are shown in greater detail in FIG. 4. The data rate sensor 44 includes track selection circuitry 70 and a count by five counter 72. Because the phase encoded read system 10 is capable of operating with one of the nine channels disabled after the occurrence of a single track error on the disabled channel, the feedback mechanism for detecting actual data rates must be responsive to two separate channels in case an error is encountered on a selected first channel causing the first channel to be disabled. In the arrangement of the track selection circuit 70 shown in FIG. 4, the data rate sensor 44 is responsive to either channel 2 or channel 7, depending on which channel first detects a data information transition. Whichever channel first becomes active then remains active until an error is detected on that channel. Upon detection of an error on the initial channel, the other channel becomes activated to provide data rate feedback control. The selection circuitry 70 includes a JK flip-flop 74, a JK flip-flop 76, an inverter 78 connected to drive the inverting clock input to flip-flop 74, and a NAND gate 80 connected to drive inverter 78. NAND gate 80 responds to the CH(7) sampling interval indicator signal and the master clock signal, Cl. An AND gate 82 responds to the CH(2) sampling interval indicating signal and the master clock signal Cl to drive an inverting clock input to flip-flop 76. The J inputs to flip-flop 74 and flip-flop 76 are responsive to a shift serially signal, SS(X). This signal goes true whenever a data information transition is detected on a currently sampled channel. The "X" means that the signal is responsive to whichever channel is currently being sampled. The K inputs to flip-flops 74, 76 are responsive to a channel error signal, $\overline{X6}$. This is also a multiplexing signal which is responsive to a currently sampled channel. Signal $\overline{X6}$ is the complement of the error data detected signal, X6. Signal X6 goes true during an interblock gap and remains true until error free 0's are detected during the course of reading a preamble for forward operation or a postamble for reverse operation. The $\overline{X6}$ signal also goes true during the reading of a block of data in the event that a channel error occurs.

Thus, during the course of reading an interblock gap, both flip-flops 74 and 76 are reset by signal $\overline{X6}$ when clocked during the respective channel 7 and channel 2 sampling intervals. The resetting of these flip-flops disables the clear inputs which are each cross-coupled to the $\overline{Q}$ outputs of the other flip-flop. As soon as error free data is detected upon reading the preamble of a data block, as indicated by shift serially signal SS(X), the corresponding flip-flop 74 or 76 is clocked to the set state. For example, assume that error free data first appears on channel 7 during a sampling interval. Signal SS(X) goes true during the channel 7 sampling interval and flip-flop 74 is clocked at the trailing edge of the master clock pulse signal, Cl for that sampling interval. The setting of flip-flop 74 disables a NAND gate 86 to remove a clear constraint from counter 72 and enables a NAND gate 88 which is coupled through a NAND gate 92 and to a count enable input of counter 72. The setting of flip-flop 74 also constrains flip-flop 76 to the clear state to disable response to channel 2 data signals. A NAND gate 92 is coupled through NAND gate 90 to an enable input of counter 72 to enable counting in the event that flip-flop 76 becomes set to indicate that the data rate feedback system should be responsive to channel 2. With the count enable input T activated during each channel 7 sampling interval, the shift serially signal SS(X) is coupled to activate a P enable input each time a data information transition is detected during a channel 7 sampling interval. Counter 72 is thus incremented at the trailing edge of the master clock pulse Cl to count data frame intervals. After counter 72 has counter 5 data frame intervals, a NAND gate 94 is activated by the QA and QC outputs of counter 72 to produce an output signal at the occurrence of the next following update sampling interval. This output signal from NAND gate 94 causes 0's to be loaded into counter 72 which immediately begins counting five more data frame intervals and also causes a count of 33 to be loaded into a down-up counter 96 which is connected to always count down during the channel 2 and channel 7 sampling intervals.

In the event that an error is detected on channel 7 during the course of reading a block of data, signal $\overline{X6}$ goes true during the channel 7 sampling interval causing flip-flop 74 to become reset. The resetting of flip-flop 74 clears counter 72 and enables flip-flop 76. During the next following channel 2 sampling interval during which a data transition is detected, shift serially signal SS(X) goes true to cause flip-flop 76 to become set. The setting of flip-flop 76 enables the T input of counter 72 during channel 2 sampling intervals and disables flip-flop 74. Four-bit counter 72 thus begins counting sequences of five data frame intervals occurring on channel 2.

While counter 72 is counting groups of five data frame intervals, counter 96 begins counting down from 33 in response to multiplex sampling cycles. With the master clock operating at synchronous speed, there should be 6.4 times 5 = 32 multiplex sampling cycles during each group of five consecutive data frame intervals. Thus, at synchronous speed as counter 96 is decremented to count 1, NAND gate 94 generates an F5 output pulse which loads this count of 1 into a four bit down counter 100 and again presets counter 96 to count 33 for another data rate feedback sampling cycle. At a time immediately prior to generation of the F5 signal by NAND gate 94 the min/max output from counter 96 is a low causing a slow signal output by an inverting NAND gate 102 which responds thereto to be high. The Q output of flip-flop 104 drives the down-up control input to counter 96 to cause counter 96 to count down. Flip-flop 104 is of such a nature that when both the clear and preset inputs are simultaneously enabled, both the Q and $\overline{Q}$ outputs go true. The inverting clear input to flip-flop 104 is coupled to the Q output thereof. Thus, once flip-flop 104 becomes reset, it cannot be again set in response to the data input controls. However, enabling of the preset input of flip-flop 104 while in a reset state, causes the Q output to go high to disable the clear input and permits the flip-flop to be preset. This presetting occurs on the rising edge of master clock Cl when either a multi-track error signal is generated by NAND gate 86 or an $\overline{F5}$ signal is generated by NAND gate 94.

Thus, the flip-flop 104 is already in the set state with the Q output thereof connected to the down-up input of counter 96 to cause that data to count down at the time a preset input to flip-flop 104 is enabled in response to the frame 5 signal $\overline{F5}$. A JK flip-flop 106 is connected such that as a number is loaded into counter 100 causing the min output to go low, the contents of flip-flop 104 are loaded into flip-flop 106. In the present example therefore flip-flop 106 becomes set as the count of 1 is loaded into counter 100. This set condition of flip-flop 106 causes the enabling of 1 input to a NAND gate 108 which is connected to the Q output of flip-flop 106. The other input to NAND gate 108 is connected through an inverter 110 from the min output of counter 100. As the min output goes low, NAND gate 108 becomes fully enabled to drive the output of an inverter 112 which is coupled to the output of NAND gate 108 high to permit current to flow through a 75 ohm resistor 114 and a diode 116 from a 5 volt source to charge a control voltage storage capacitor 118. A 22 ohm resistor 120 is coupled between the output of inverter 112 and an anode of diode 116, but because inverter 112 has an open collector output no current flows through resistor 120 when the output of inverter 112 is high. However, when the output of inverter 112 is low, current does flow through resistor 120 to reverse bias diode 116 and prevent current from flowing therethrough to charge capacitor 118. Normally, current flows from a 5 volt source through a 2.7K resistor 122 to supply to capacitor 118 an amount of current which is approximately equal to the current which is drawn by a voltage control oscillator 124 connected thereto. However, as the output of inverter 112 goes high a somewhat greater additional current begins flowing through diode 116 to charge capacitor 118. However, the $\overline{F5}$ signal is generated during the update sampling interval and approximately 1/2 multiplex sampling cycle later, at the end of the channel 4 sampling interval, the $\overline{CH(4)}$ signal makes a low to high transition to clock both counter 196 and counter 100. As counter 100 is clocked it is decremented to 0 and the min output therefrom goes high. This high min output disables a count enable input G, to counter 100 to prevent further counting and also disables NAND gate 108 causing the output of inverter 112 to go low and again reverse bias diode 116. Diode 116 is thus allowed to conduct for only a very short period of time (approximately 6 master clock pulses) and the voltage across capacitor 118 is not changed appreciably. The frequency of voltage controlled oscillator 124 is thus increased to a rate of 1 or 2 percent in excess of synchronous speed. Optimum accuracy has been found to occur when the clock generator is running very slightly on the fast side. Small speed adjustments can of course be made by changing the count of 33 which is loaded into counter 96.

In the event that the master clock generator is operating at a rate less than 64 clock pulses per data frame interval, the counter 96 will have counted down to a number greater than 1 at the time the frame 5 signal $\overline{F5}$ is generated and a number greater than one will be loaded into counter 100. Diode 116 will then be conductive for a somewhat longer period of time as counter 100 counts down to 0. The increased conduction time for diode 116 will increase the voltage on capacitor 118 to increase the frequency of voltage controlled oscillator 124. Since the count which is entered into counter 100 is proportional to the difference between synchronous and actual master clock frequency, and since the time during which diode 116 conducts is proportional to the count entered into counter 100, proportional feedback control is provided to maintain the oscillating frequency of oscillator 124 at approximately the synchronous rate.

In the event that oscillator 124 operates at a rate faster than the synchronous rate, counter 96 becomes decremented to 0 prior to the generation of the $\overline{F5}$ signal at the end of 5 actual data frame intervals. As counter 96 reaches a count of 0, the max/min output goes high causing the slow signal generated by NAND gate 102 to go low at the end of the channel 4 sampling interval. At the end of the immediately subsequent channel 5 sampling interval flip-flop 104 is clocked to the reset state and further data input control is disabled. The resetting of flip-flop 104 commands counter 96 to begin counting up with counter 96 being incremented at the end of each channel 4 sampling interval. Counter 96 then counts multiplex sampling cycles until signal $\overline{F5}$ is generated at the end of five actual data frame intervals. For example, if three multiplex sampling cycles occur before the end of five data frame intervals, counter 96 will store a count of three at the time signal $\overline{F5}$ is generated. Signal $\overline{F5}$ will cause the count of three to be loaded into counter 100, cause the reset condition of flip-flop 104 to be loaded into flip-flop 106 and cause flip-flop 104 to be preset. The resetting of flip-flop 106 and the disappearance of the min output signal from counter 100 when a count of three is loaded therein causes a NAND gate 126 to be enabled and the output thereof to go low. The low voltage output of NAND gate 126 causes current to flow from capacitor 118 through a 120 ohm resistor 128 and a diode 130 to the output of NAND gate 126. This current tends to discharge capacitor 118 and decrease the control voltage thereacross to decrease the frequency of voltage controlled oscillator 124. As counter 100 becomes decremented to 0 at the end of three multiplex sampling cycles, the min output again goes high to inhibit further activity of the counter and disable NAND gate 126. The output of NAND gate 126 then goes high to prevent further current flow through resistor 128 and diode 130. The current drain on capacitor 118 and corresponding voltage drop thereacross is thus proportional to the count which is loaded into count 100 when signal $\overline{F5}$ is generated. The decrease in the voltage across capacitor 118 is thus proportional to the difference between the actual rate of the master clock signal Cl and the synchronous rate and provides proportional feedback control to decrease the rate of oscillator 124 when it is operating faster than synchronous speed. Thus, whether operating faster than synchronous speed or slower than synchronous speed, the oscillator 124 is controlled such that it will operate 1–2% faster than the synchronous speed with approximately 64 master clock pulses being generated during each data frame interval. The use of counter 72 to provide clock frequency control in response to five consecutive data intervals instead of a single data frame interval provides an averaging effect which eliminates any timing disturbances which may be caused by a time deviation of a single data information transition as well as one or two percent timing variations which may occur due to the exact sampling instance of the synchronous feedback control system.

The voltage controlled oscillator 124 includes a 2K resistor 140 coupled between capacitor 118 and the input to an inverter 142, a capacitor 144 coupled between the input to inverter 142 and ground, and a diode 146 having the cathode thereof coupled to the output of inverter 142 and the anode coupled through a 100 ohm resistor 148 to the input of inverter 142. The resistor 140 acts as a current source to charge capacitor 144. As the voltage on capacitor 144 reaches the transition point for inverter 142, the output of inverter 142 goes low to draw current through resistor 148 and diode 146 to discharge capacitor 144. As capacitor 144 discharges below the transition point for inverter 142 the output of inverter 142 goes high and capacitor 144 is permitted to again begin charging. Because resistor 148 is much smaller than resistor 140, capacitor 144 is discharged relatively rapidly after the output of inverter 142 goes low and the frequency of oscillation of oscillator 124 is substantially controlled by the charging rate of capacitor 144. Since this charging rate is dependent upon the current through resistor 140 which is in turn dependent upon the voltage across capacitor 118, the oscillating frequency of voltage controlled oscillator 124 is generally proportional to the voltage across capacitor 118.

A waveshaping circuit 150 which generates the complement, $\overline{\text{Cl}}$, of the master clock signal at the output thereof includes a NAND gate 152 having a first input coupled to the output of inverter 142 and a second input coupled through a capacitor 154 to ground. The second input is also coupled through a 330 ohm resistor 156 and an inverter 158 to the output of inverter 142.

While the output of inverter 142 is low, the output of inverter 158 is driven high to charge capacitor 154 through resistor 156 and enable the second input to NAND gate 152. As the output of inverter 142 goes high, the first input of NAND gate 152 becomes enabled. Because capacitor 154 cannot discharge immediately, the output of NAND gate 152 goes low for a short period of time while capacitor 154 discharges through resistor 156. A master clock pulse is thus generated for each low to high transition of the output of inverter 142 and has a duration which is controlled by the time constant of capacitor 154 and resistor 156 independent of the frequency of oscillation of voltage controlled oscillator 124.

A control clock generating circuit 160 responds to the complement master clock signal $\overline{\text{Cl}}$ and the update sampling interval signal to generate the uncomplemented master clock signal, Cl, the complement of the clock update signal, $\overline{\text{CU}}$, concurrently with every tenth master clock pulse and the clock input data signal, CID, concurrently with the master clock pulse signal Cl except when the signal $\overline{\text{CU}}$ is generated. Control clock signal generator 160 also generates the complement, $\overline{\text{CID}}$, of the clock input data signal and a fanout of the complement $\overline{\text{Cl}}$ of the master clock signal.

Figure 2:
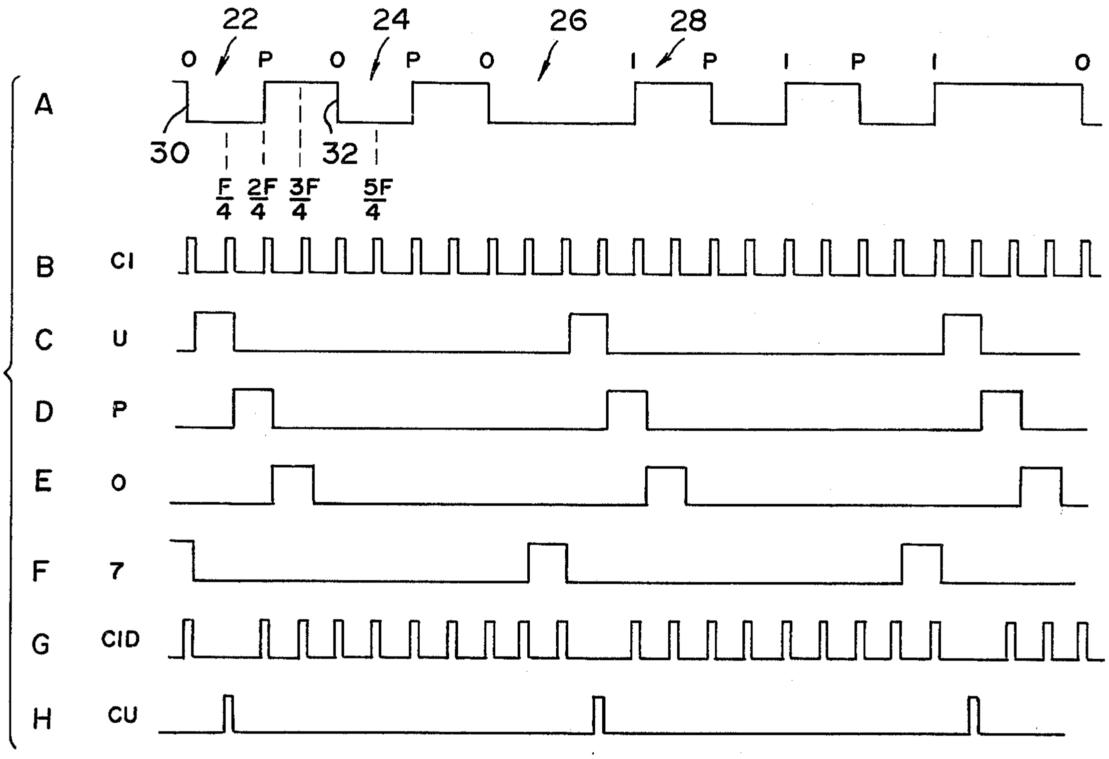
FIG. 2 is a graphical representation of several signals which are pertinent to the operation of the invention.

Referring now to FIG. 1 a triple 9 to 1 multiplexer 170 receives the three outputs from each of the data detectors 18 and outputs these three signals from selected ones of the data detectors 18 in accordance with address inputs from binary coded decimal counter 46. A demultiplexer 172 also responds to the address outputs from BCD counter 46 to generate clear signals $\overline{\text{CL(X)}}$ on selected outputs in accordance with the address inputs when enabled by a $\overline{\text{CID}}$ signal which indicates a channel multiplexing sampling interval as opposed to an update multiplexing sampling interval and when also enabled by a TD'(X) signal which indicates the presence or absence of an information transition during an immediately preceding multiplex sampling interval. The clear signal outputs from demultiplexer 172 are connected such that if enabled, a clear signal for a given channel is generated during the multiplex sampling interval immediately subsequent to the multiplex sampling interval for that channel. For example, the clear signal, CLP, for the parity channel is generated during each channel 0 multiplex sampling interval and the channel 0 clear signal CLO, is generated during the channel 1 sampling interval.

An Exclusive-OR gate 190 generates a data(X) signal in response to a multiplex D(X) signal from the data detectors 18 and a reverse signal from the tape transport control system (not shown). Gate 190 inverts the polarity of the data signal D(X) provided by the read head 14 when a tape transport is reading backwards to compensate for a reversal of polarity that results from reverse operation. A nine bit data detected shift register 192 is clocked by the clock input data signal, CID, to operate in multiplex fashion to keep track of whether error free data has been detected on a given channel. A logic 1 on the X6 output signal from data detect register 192 indicates that error free data has been detected on the channel corresponding to a current multiplex sampling interval as designated by BCD decoder 48. A logic 0 indicates that data has not yet been detected or that an error has occurred on a given channel during the reading of a block of data information. Once an error is detected on a given channel, that channel is disabled by a logic 0 in the data detector 192 storage location for that channel until the reading of a block of data has been completed. The multiplex input to data detection register 192 has the logical function $$\text{1NX6} = [\text{X6} + \text{TD(X)} \cdot \overline{\text{data(X)}}] \cdot \overline{\text{ERROR 1}} \cdot \overline{\text{ERROR 2}} \cdot \overline{\text{ERROR 3}} \cdot \overline{\text{ERROR 4}} \quad (1)$$

The X6 term in the 1NX6 function permits a logic 1 state to be continued for a channel position once data has been detected unless one of the error conditions is indicated. The TD(X) term indicates that an information transition has been detected by a data detector 18 for a given channel and the $\overline{\text{data(X)}}$ term requires that the information transition be of a logic 0 polarity. These two terms together permit synchronization of the channel and generation of a logic 1 input to data detector register 192 as a string of 0's is being read from the preamble of a block of information (or postamble when reading backwards).

The ERROR 1 term has the logical function $$\text{ERROR 1} = \text{X6} \cdot \text{X3} \cdot \text{X1} \quad (2)$$

and is generated after data has been detected on a given channel and more than 5/4 of a nominal data frame interval pass without detection of a data information transition on the channel. The X3 and X1 term are binary count terms with X3 having a weight of 4 and X1 having a weight of 1 to indicate a count of 5. These terms are generated by a frame counter 196 which counts quarter data frame intervals with the first quarter being designated count 0 so that a count of five indicates that a sixth quarter has begun without detection of a data information transition.

The ERROR 2 term has the logical function $$\text{ERROR 2} = \text{DE3} \cdot \overline{\text{X6}} \quad (3)$$

and indicates that an error has occurred on a given channel once the reading of data information within a block of information has begun. Because skew synchronization on a channel may be lost once an error is detected, the error 2 term is utilized to lock out a given channel once an error is detected while reading data and prevent the TD(X) and $\overline{\text{data(X)}}$ term from reactivating a channel in which an error has ocurred except during the preamble and postamble of a block of information.

The ERROR 3 term has the logical function $$\text{ERROR 3} = \text{DE3} \cdot \text{TD(X)} \cdot \overline{\text{1NX3}} \cdot \overline{\text{1NX1}} \cdot (\text{X4} \oplus \overline{\text{1NX2}}) \quad (4)$$

and has the effect of generating an error signal if a transition occurs during a first quarter of a data frame or if a transition occurs in a third quarter of a data frame after a phase transition has already occurred for the data frame. The X4 term is generated at the output of a 9 bit multiplexing phase register 198 and indicates that a transition has been detected within the first three quarters of a data frame interval. The 1NX3 term represents the output of the second stage of frame counter 196 and has a weight of 2.

The ERROR 4 term has the logical function $$\text{ERROR 4} = \text{DE3} \cdot \text{TD(X)} \cdot (\text{Data(X)} \oplus \text{X4} \oplus \text{X7}) \quad (5)$$

and becomes operative to generate an error signal if a transition is not of the proper polarity. This term requires each phase transition to be of a polarity opposite the immediately preceding data information transition, and each data information transition to be of the same polarity as the immediately preceding data transition if there has been an immediate phase transition and of the opposite polarity of the immediately preceding data information transition if there has been no intermediate phase transition. The term X7 indicates the polarity of the immediately preceding data information transition.

A file mark detection NAND gate 200 has three noninverting inputs responsive to outputs QA, QB and QF of data detection shift register 192 and complementing inputs responsive to outputs QD, QE and QG of data detection shift register 192. As used herein, the first or input bit position of data detection shift register 192 has an input designated QA while the ninth or output stage of shift register 192 has an output designate QI and all intermediate bit positions are designated alphabetically in order from the input end to the output end. While the channel to which a given bit position in register 192 is responsive varies with each sampling interval within a multiplex sampling cycle, the file mark signal, $\overline{\text{FM}}$, is considered to be valid only during the update multiplex sampling interval. During the update multiplex sampling interval, the file mark signal becomes active only when logic 1 information states appear on channels 7, 6, and 2 and logic 0 states appear on channels 4, 3, and 1.

A transition detected hold flip-flop 204 is connected to be clocked by the CID clock signal and has the D input thereof connected to receive the transition detected signal, TD(X) from multiplexer 170. Flip-flop 204 is clocked at the end of a data frame interval to hold a transition detected signal into the next data frame interval. The Q output of flip-flop 204 generates a signal TD′(X) during each subsequent data frame interval to enable demultiplexer 170 to permit a clear signal to be generated during a subsequent sampling interval whenever a transition detected signal, TD(X) has been generated during the preceding sampling interval. Demultiplexer 172 then generates a clear signal $\overline{\text{CL(X)}}$ to clear the data detector circuit 18 which generated the transition detected signal during the preceding sampling interval.

Phase register 198 is a 9 bit shift register which is clocked in response to the complement of the clock input data signal, $\overline{\text{CID}}$. An address input is responsive to the transition detected signal, TD(X), such that when this signal is at logic 0 the input stage of the shift register is responsive to an IO input which is coupled to receive the X4 output of shift register 198. In the event that the transition detected signal TD(X) is true during a multiplex sampling interval, an I1 input is addressed which is connected to respond to a signal I. Signal I is generated by logic 206 and is at lofic 1 to indicate a phase transition whenever an information transition is detected during the first three quarters of a nominal data frame interval and is at logic 0 otherwise. The contents of register 198 are thus set to logic one to indicate a phase transition, set to logic 0 to indicate a data information transition, and recirculated in the event that no transition is detected.

Figure 5:
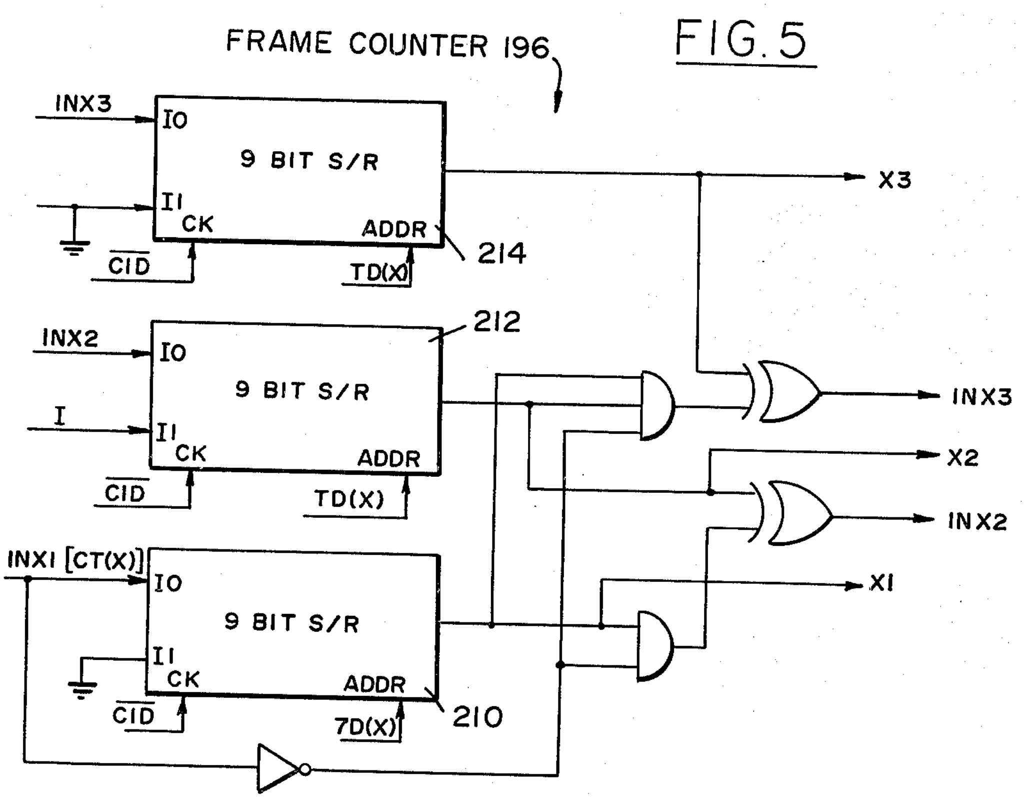
FIG. 5 is a schematic representation of a frame counter circuit shown in block form in FIG. 1.

Frame counter 196, which is shown in somewhat greater detail in FIG. 5, is a three bit counter with the three bit positions for a given channel arranged vertically in three separate nine bit shift registers. During the course of a multiplex sampling cycle, the three bits which correspond to each channel are shifted from left to right by one bit position for each multiplex sampling interval such that the output signals correspond to a current sampling interval. Within the frame counter 196 a nine bit shift register 210 stores the least significant bit, a nine bit shift register 212 stores the second least significant bit and a nine bit shift register 214 stores the most significant bit. Each register 210, 212 and 214 responds to one of two inputs, I0 or I1, at the first or input bit position, in accordance with an address input. The transition detected signal, TD(X) is connected to drive the address input such that the I0 inputs are addressed when a transition is not detected and the I1 inputs are addressed during a sampling interval immediately following the detection of an information transition by a data detector 18. The I1 inputs of registers 210 and 214 are connected to ground while the I1 input of register 212 is connected to the signal I. In this way the phase counter for a given channel is preset to count 0 upon detection of a data information transition and preset to count 010 upon detection of a phase transition. The frame counter 196 is thus resynchronized with the actual occurrence of information transitions upon detection of each information transition. The I1 input to the least significant bit register 210 input is responsive to the multiplex signal CT(X) and substantially duplicates the contents of the flip-flop 64 of the data detectors as shown in FIG. 3. The I0 inputs of registers 212 and 214 have their inputs 1NX2 and 1NX3 connected to respond to conventional counting circuitry to permit the counter 196 to be incremented each time the signal CT(X) changes states. The outputs from shift registers 210, 212 and 214 are designated X1, X2 and X3 respectively and indicate a binary count of the number of at least partially elapsed quarter data frame intervals subsequent to a preceding data information transition for a given channel sampling period during a multiplex sampling interval for that channel. Logic 206, which generates the 1NX6 data detected signal, also generates the phase transition signal $$\text{I} = \text{data(X)} \cdot \overline{\text{DE3}} + (\overline{\text{1NX2 \& 1NX1}}) \cdot \overline{\text{1NX3}} \quad (6)$$

to indicate a phase transition. The first term indicates that a logic 1 information state transition has been detected outside a block of data information. Since the preamble and postamble are outside the block of data information and contains only zero data transitions, such a 1 information transition must be a phase information transition. This term permits detection of phase transitions prior to synchronization of a channel with information recorded on the tape. The second term causes signal I to go to logic 1 during the first, second and third quarters of a nominal data frame interval.

This term is operative after data synchronization for a given channel is achieved to prevent data information transitions occurring in the fourth or fifth quarters of a data frame interval from being interpreted as phase transitions. Logic circuitry 206 also generates a shift serially signal SS(X) in accordance with the logic equation $$SS(X) = TD(X) \cdot \bar{T} \cdot \overline{ERROR}, \text{ where} \quad (7)$$

$$ERROR = ERROR\ 1 + ERROR\ 2 + ERROR\ 3 \quad (8)$$

The shift serially signal serves as a clock signal for deskew circuitry and is generated each time an information transition is detected on a currently sampled channel and the transition is not a phase information transition and no errors are detected.

Figure 6:
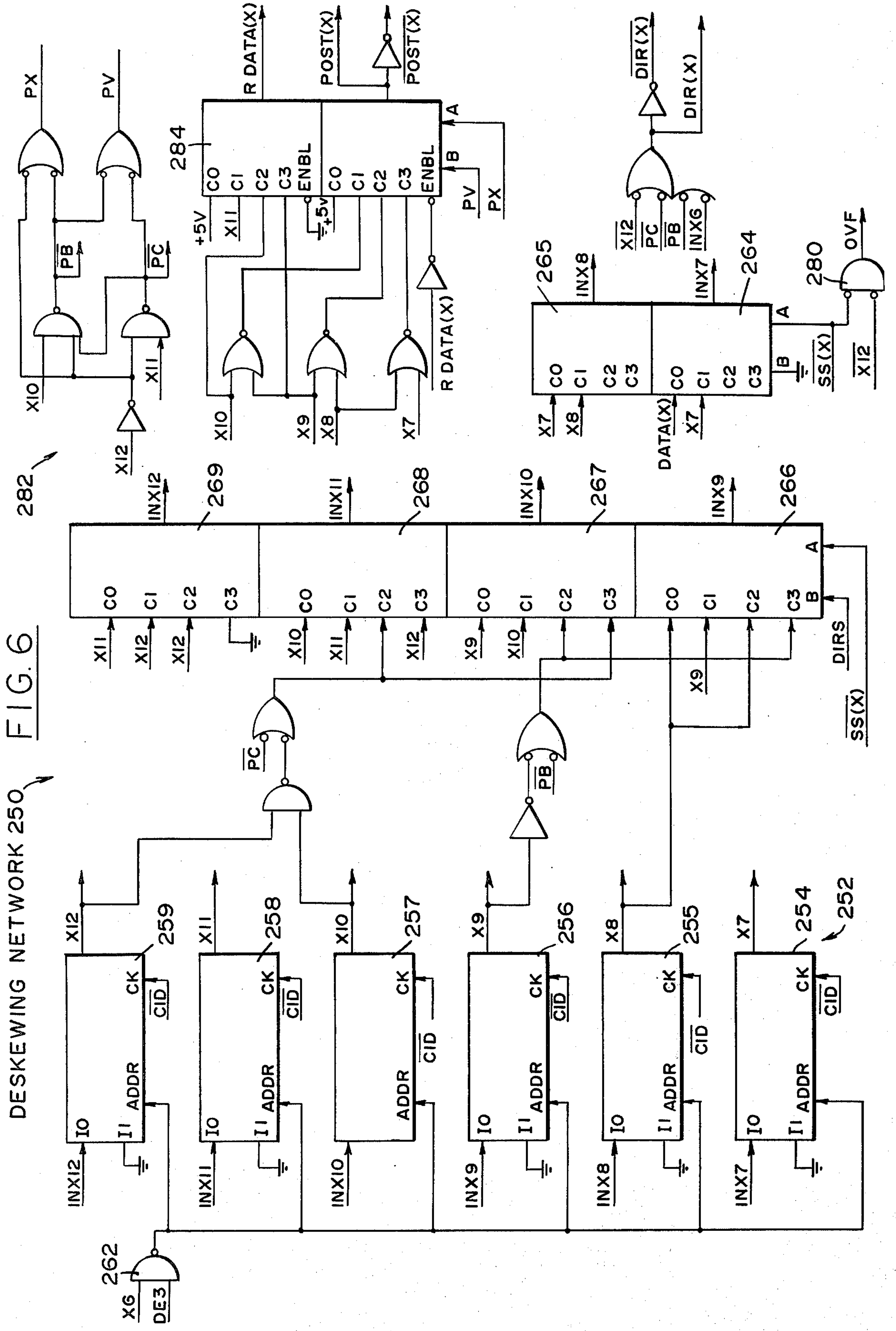
FIG. 6 is a schematic representation of a portion of the data detection circuit in accordance with the invention.

A deskewing network 250 is shown in FIG. 6 and includes a double axis shift register 252 having six nine bit shift registers 254–259. The double axis or quadrature shift register 252 is arranged with each shift register 254–259 storing one bit position for each channel which is shifted left to right and recirculated in accordance with the multiplexed sampling intervals during the course of a multiplex sampling cycle. In addition, circuitry external to the shift registers 254–259 is arranged to make the six vertically stacked bits corresponding to a sampled channel operate as a shift register with new data information being shifted into the bottom register 254 and with data information already stored for a sampled channel being shifted vertically upward. Each of the shift registers 254–259 is clocked in response to the clock input data signal $\overline{CID}$ and has an address input responsive to a NAND gate 262 which is in turn responsive to the signals X6 and DE3. As a result, unless signal DE3 is true to indicate that data has been detected on at least two channels for approximately 17½ data frame intervals and data has been detected on the particular channel which is currently being sampled, the addressed input is driven to activate the I1 input and cause all zeros to be loaded into the vertically extending register position for a given channel. Once data has been properly detected, the address inputs are driven to activate the I0 inputs and permit the deskewing register 252 to operate in a normal deskewing mode.

In operation, each vertically extending channel of deskewing register receives data which is read from tape through the bottom register 254 with information being shifted vertically upward as new data is received. The logic 1 data information state which is required to immediately precede each block of data information is utilized as an index bit. Because the preamble and postamble contain all zeros except for a single one bit adjacent the block of data information, all zeros are shifted into the vertically extending channel registers until this one bit is received. As the first one bit is shifted vertically upward, it marks the demarcation between preamble or postamble zero information and data information. Thus, information stored in a vertically extending channel register below the index bit is data information. The vertically extending channel registers are operated as first in first out shift registers with data information being output from the register position immediately below the index bit. As information is output from a channel register, the index bit is shifted vertically downward to the position from which the data information was output and is replaced with a zero at the former position thereof.

The inputs 1NX7–1NX12 to registers 254–259 are provided by outputs of six 4 to 1 multiplexer 264–269 respectively. Each multiplexer 264–269 has four data inputs designated C0–C3 which are addressed in accordance with two data inputs A and B. The least significant or A inputs are responsive to the complement of the shift serially signal, SS(X). The B or most significant address inputs of multiplexer 264 and 265 are connected to ground while inputs of multiplexers 266–269 are responsive to a data input ready shift signal, DIRS. This signal is generated when the availability of data has been detected on all active channels during the immediately preceding multiplex sampling cycle and causes data to be output from the deskew register 252 when true.

The most common circumstance will occur when signal DIRS is false because data is not being output and signal SS(X) is true because data is not being input. Under this circumstance the C1 inputs to each of the multiplexers 264–269 are addressed and data is merely circulated from the outputs to the inputs of shift registers 254–259. In the event that signal SS(X) goes low, the C0 inputs are addressed. The C0 input to position seven multiplexer 264 is responsive to the data (X) signal and receives the data information state corresponding to a data information transition which caused the generation of the shift serially signal. The C0 input to each of the other multiplexers 265–269 are responsive to the output of the shift register 254–258 which is one bit position below the bit position to which the multiplexer corresponds. Data is thus shifted vertically upward one bit position as new data is entered into a vertically extending channel register. In the event that no data is being entered into the register but the DIRS signal is true to cause data to be removed from the deskew register 252, the C1 inputs of multiplexers 264 and 265 are addressed and the C3 inputs of multiplexers 266–269 are addressed. Multiplexers 264 and 265 do not permit data to be removed from the two lower bit positions and therefore merely recirculate registers 254 and 255 as data is removed from deskew register 252. However, removed data may appear on signals X9, X10 or X11 depending upon the position of the index bit and the C3 inputs to multiplexers 266 and 267 depend upon the position of the index bit. A zero is always shifted into the upper most register 259 and this is accomplished by connecting the C3 input to multiplexer 269 to ground. Similarly, the contents of the upper most register 259 may always be shifted into the X11 position when data is removed. If the index bit were previously at the X12 position it is then automatically shifted to the X11 position by connection of signal X12 to the C3 input of multiplexer 268. On the other hand, if the X12 position does not store the index bit, a logic zero is necessarily stored there and this logic zero is properly shifted into the X11 position whether the index bit was at the X9, X10 or X11 position. On the other hand, the information which is shifted into the X10 position does depend upon the position of the index bit. The C3 input to multiplexer 267 is therefore driven with the signal $PC + \overline{X12} \cdot X10$. The signal PC has the logical function $PC = \overline{X12} \cdot X11$ and indicates that the index bit was formerly located at position X11 and causes this bit to be shifted into the X10 bit position. In the event that the index bit is located at position X12, register position X10 is recirculated. If the index bit was located at register position X10, it must be shifted vertically downward to position X9 and a zero is written into position 10. The C3 input to multiplexer 266 is driven in accordance with the logical function C3 = PB + X9. The signal PB indicates that the index bit position is at X10 in which case it must be moved vertically downward with a 1 being shifted into position X9. Since data is output only if the index bit is at position X10, X11 or X12, the index mark must be positioned in at X11 or X12 if it is not at X10 and register 256 is recirculated in this event.

In the event that data is simultaneously shifted both into and out of a vertically extending channel register, the C0 inputs of registers 264 and 265 are addressed as in a normal data entry shift operation and the C2 inputs to multiplexers 266–269 are addressed. When data is simultaneously shifted in and shifted out, only the bit positions below the index mark can be changed. The bit positions at or above the index mark must be recirculated. Since position X12 cannot be below the index mark the C2 input of multiplexer 269 is connected to signal X12 for recirculation. The C2 input to multiplexer 268 for position X11 is connected to recirculate the index mark if it is located at that position and to shift the contents of position X10 vertically upward to position X11 if the index mark is located at position X12. Otherwise a zero is loaded into position X11. The C2 input to X10 multiplexer 267 is connected to recirculate the index mark if it is located at position X10. If the index mark is not located at position X10 it must be located above position X10 and the contents of position X9 are shifted vertically upward to position X10. The index mark is not permitted to be located at position X9 and therefore the C2 input to multiplexer 266 is connected to the signal X8 to cause the information stored by register 255 to be shifted vertically upward from position X8 to position X9.

A NOR gate 280 responds to the complement of the shift serially signal $\overline{SS(X)}$ and the complement of the X12 signal, $\overline{X12}$, to generate an overflow signal, OVF whenever the shift serially signal indicates that a new data transition has been detected while the index bit is in the X12 or maximum position.

An index position circuit 282 generates signals to indicate the position of the index bit in the deskew register 252. A signal PC indicates that the index bit is at position X11 while a signal PB indicates that the index bit is at position X10. A signal PX indicates that the index bit is at either position X10 or X12 and a signal PV indicates that the index bit is at either position X10 or X11.

The PX and PV signals are utilized as address inputs to a dual 4 to 1 multiplexer 284. Multiplexer 284 outputs a serial data signal RDATA(X) which is indicative of the contents of the bit position in the deskew register 252 immediately behind the index bit when the index bit is at positions X10, X11 or X12 and a logic one otherwise. Demultiplexer 284 also outputs a postamble signal, post(x) whenever data is available for outputting from the deskew register 252 and a sampled channel has the data content of a logic one followed by two zeros. It should be recalled that the actual postamble contains a logic one followed by 40 zeros. However, detection of the postamble is assumed when a logic one followed by two zeros is detected on all active channels. If the index bit is at positions X7, X8 or X9 in the deskew register 252, the C0 inputs of demultiplexer 284 are enabled causing the RDATA(X) signal to go true and to enable the second half of the demultiplexer 284 and permit the POST(X) signal to go true. However, these signals are not acted upon by the read data system 10 inasmuch as the index bit is not in one of the positions within the deskew register which permits the outputting of data information. If the index bit is at position X10, signals PV and PX are both true and inputs C3 are addressed. The RDATA(X) signal thus indicates the contents of position X9 which is immediately behind the index bit. Signal RDATA(X) then enables the second half of the demultiplexer 284 to permit a logic one to be output on the POST(X) signal if logic 0's are stored in deskew register 252 positions X7 and X8. If the index bit is positioned at X11 in the deskew register 252, inputs C2 are addressed and signal RDATA(X) indicates the contents of bit position X10. The POST(X) signal is then generated if position X10 stores a logic one while positions X9 and X8 store logic 0. Similarly, if the index bit is located at position X12, inputs C1 are addressed to permit the data information to be indicated by signal RDATA(X) and to permit signal POST(X) to indicate whether the conditions for the presence of the postamble have been satisfied.

Figure 7:
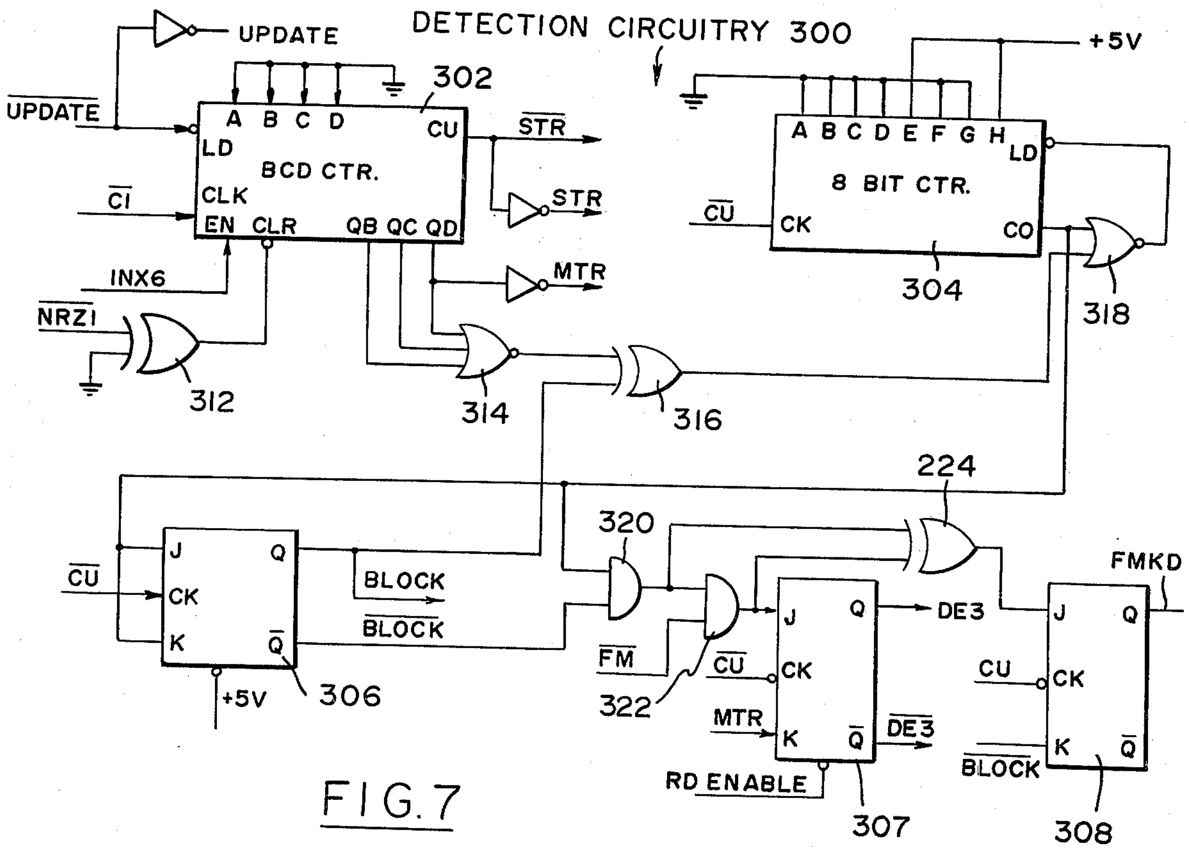
FIG. 7 is a schematic representation of detection circuitry for the data detection circuit in accordance with the invention.

As shown in FIG. 7, detection circuitry 300 includes a BCD counter 302, an 8 bit binary counter 304, JK flip-flops 306–308, and assorted logic gates. Detection circuitry 300 detects the proper operation of the read circuitry 10 as a block of information is being read. Whenever an $\overline{NRZI}$ signal goes high to indicate that data reported in a phase encoded format rather than an NRZI format is to be read, the output of an Exclusive-OR gate 312 disables a clear input to counter 302 to permit counter 302 to operate during a sampling cycle to count the number of channels on which error free data has been detected. The signal 1NX6 indicates whether or not error free data has been detected on a sampling channel. If error free data has been detected on all channels, the counter 302 will reach a count of 9 by update time and the complement of the single track error signal, $\overline{STR}$ will go high as the C0 output of counter 302 goes true on the count of 9. If error free data is detected on only 8 channels as indicated by signal 1NX6, the counter 302 will reach only a count of 8 at the end of a sampling cycle and a logic one single track error signal, STR will be generated as the complement of the C0 output of counter 302 at update time. However, output QD will be at logic 1 to indicate a count of 8 and the multiple track error signal, MRT, which is generated as the complement of output QD will be at logic 0. In the event that the data detected signal, 1NX6, falls on two or more channels, counter 302 will reach a count less than 8 at update time and both the multiple track error signal MTR and single track error signal STR will be generated.

8 bit counter 304 and flip-flop 306 operate to determine whether or not the read head is positioned within a block of information or at an interblock gap location on tape. While an interblock gap on the tape is moving past the read head, the Q output of flip-flop 306 designated BLOCK, is at logic 0 and the output of a NOR gate 314 is at logic 1 since data will not be detected on any of the channels and counter 302, which is reset at each update time, will be maintained at a count of 0. Exclusive-OR gate 316 responds to this logic 1 and logic 0 input to generate a logic 1 output to activate NOR gate 318 and constrain 8 bit counter 304 to a load condition in which the binary equivalent of count 144 is loaded into counter 304. As soon as data is detected on at least two channels, one of the outputs QB, QC or QD from counter 302 will be enabled to activate NOR gate 304 to cause the output of Exclusive-OR gate 316 to go low and permit counter 304 to begin counting sampling cycles. During the course of approximately 17.5 data frame intervals the counter 304 will count from 144 to 255 to generate a logic 1 signal on the C0 output therefrom. This carry output is connected to toggle flip-flop 306 to the set state at the next update multiplex sample time. As flip-flop 306 is set, the block signal output generated by the Q output therefrom causes Exclusive-OR gate 316 to generate an output to constrain counter 304 to a load condition so long as error free data is detected on at least two channels during each multiplex cycle. Since a preamble of a block of information contains 40 zeros, and only 17½ data frame intervals are required for generation of the block signal, this signal is normally generated well before the data block within an information block is actually reached.

At the time immediately before the clock pulse which sets flip-flop 306, the C0 output from counter 304 is true and the $\overline{\text{block}}$ signal generated by the $\overline{Q}$ output of flip-flop 306 is also true. An AND gate 320 which is responsive to these signals is thus fully enabled to generate a true output and an AND gate 322 is also enabled if the file mark signal indicates that a data information block has been encountered as opposed to a file mark information block. Under these circumstances, flip-flop 307 which has the J input thereto connected to the output of AND gate 322 is set at the leading edge of the clock update signal, CU. Flip-flop 307 generates a data enable signal DE3 at the Q output thereof. Thus, as flip-flop 306 is toggled to indicate that a block of information has been detected, flip-flop 307 is also set to indicate that data information has been detected if the file mark signal is not active. On the other hand, if the file mark signal is active, signal $\overline{\text{FM}}$ is at logic 0, an AND gate 322 is disabled, and Exclusive-OR gate 324 is enabled to drive the J input to flip-flop 308 and cause a file mark detected signal, FMKD to be generated by the Q output thereof while flip-flop 307 remains in the reset state. Thus, flip-flop 306 indicates the detection of a block of information while flip-flops 307 and 308 indicate whether the information is data information or file mark information. After the postamble has passed the read head, data error will be indicated on all channels and the output of NOR gate 314 will be loaded at update time causing the output of Exclusive-OR gate to go low and permit counter 304 to begin counting. As counter 304 counts from 144 to 255, the C0 output will again go high to toggle flip-flop 306 and again constrain counter 304 to the load condition until another block of information is encountered. The $\overline{\text{block}}$ signal drives the K input to flip-flop 308 to cause this flip-flop to reset and terminate the file mark detected signal FMKD at the next update time after the $\overline{\text{block}}$ signal goes true. The K input to flip-flop 307 is driven with the multiple track error signal MTR to cause flip-flop 307 to reset and terminate the data enable signal, DE3 as soon as a multiple track error is detected, whether or not the reading of data information has been completed. In the event of a single track error, the parity channel permits reconstruction of the data contents of the channel which is in error and the reading of data is not inhibited by the resetting of flip-flop 307.

Figure 8:
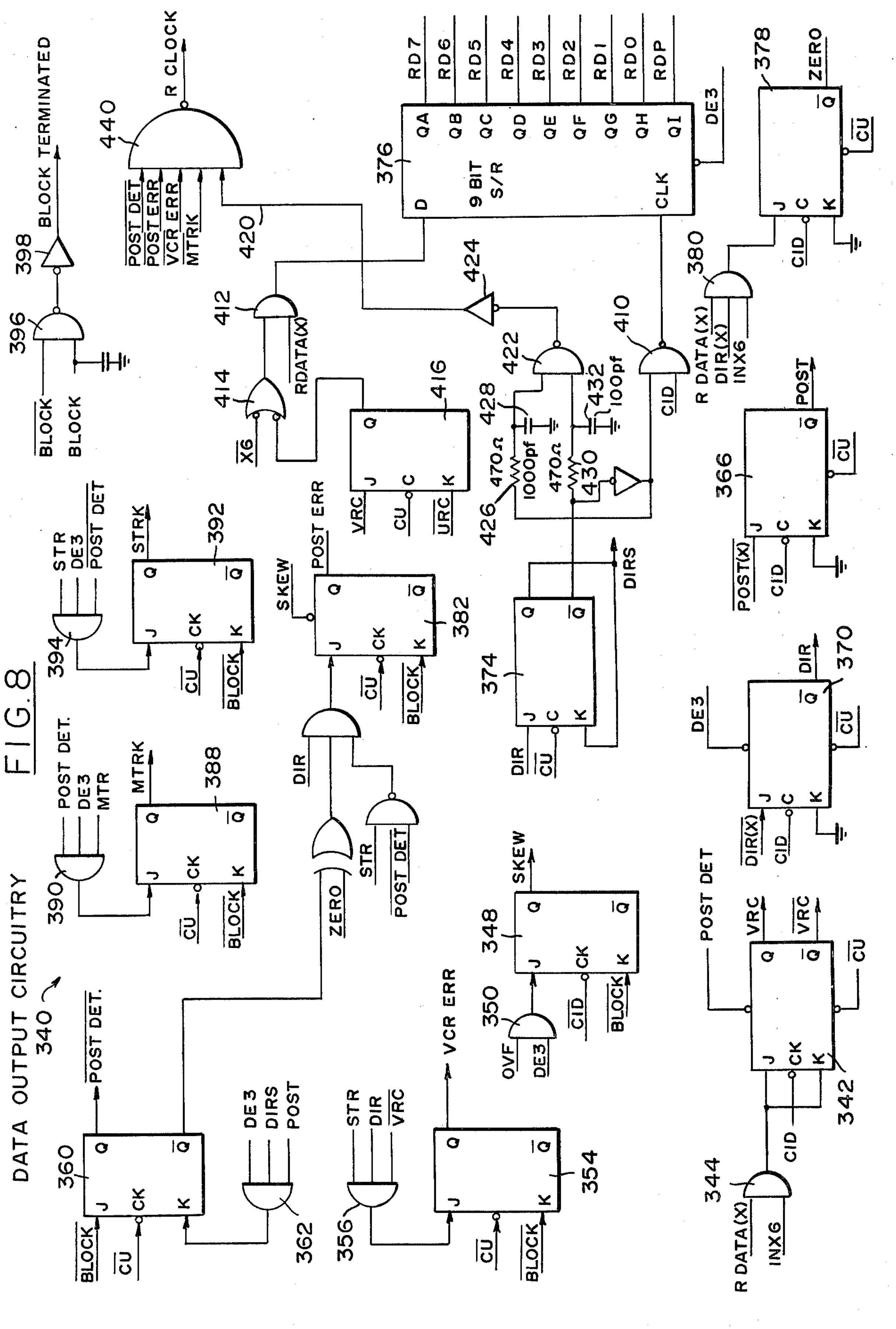
FIG. 8 is a schematic representation of output circuitry of the data detection circuit in accordance with the invention.

Data output circuitry 340 is shown in FIG. 8. This circuitry executes a serial to parallel conversion of data which is output from the deskew register 252 in a multiplex serial fashion and also generates signals which are required by a tape transport control system for proper operation of the tape transport.

A vertical redundancy check flip-flop 342 has the J and K inputs thereto connected to the output of an AND gate 344 and a complementing clock input connected to receive the clock input data signal, CID. AND gate 344 is responsive to the serial data signal, RDATA(X) and the data detected signal, 1NX6. Flip-flop 342 is cleared at update time and then toggled each time a logic 1 data signal is detected on a sampled channel during a subsequent sampling cycle. It will be recalled that multiplexer 284 generates a logic 1 RDATA(X) signal in the event that data is not available for outputting on a sampled channel. At the subsequent update time the VRC signal generated by the Q output of flip-flop 342 thus indicates odd or even parity for a byte of data that is about to be output from the deskew register 252. If all 9 channels are operative the signal VRC should be at logic 1 to indicate odd parity at update time. Upon detection of the postamble, flip-flop 342 is constrained to be preset by a postamble detected signal $\overline{\text{POST DET}}$ to prevent generation of an error signal since even parity and not the usual odd parity is encountered in the preamble and postamble, the constraining of flip-flop 342 to indicate proper parity during the postamble causes 0 data state information to be properly supplied by data reconstruction circuitry on a channel which has been disabled and has created a single track error condition.

A flip-flop 348 generates a deskew signal at the Q output thereof to indicate and latch an overflow condition of the deskew register 252 while data information is being read. The J input to flip-flop 348 is driven by an AND gate 350 which is responsive to the overflow signal OVF and the data enabled signal, $\overline{\text{DE3}}$. The K input to flip-flop 348 is responsive to the $\overline{\text{block}}$ signal which indicates that a block of information is not passing adjacent the read head.

A flip-flop 354 detects and latches a vertical parity check error signal, VCR ERR. Flip-flop 354 is clocked at update time and has the J input thereof driven by the output of an AND gate 356 which is responsive to the complement of the single track error signal, $\overline{\text{STR}}$, the data input ready signal, DIR, and the complement of the vertical redundancy check signal, $\overline{\text{VRC}}$. Thus, if all channels are operative and data is available for outputting from all channels, the VCR ERR signal is generated in the event that odd parity is not indicated by flip-flop 342 at the end of a sampling cycle.

A postamble detected flip-flop 360 is clocked at update time and has the J input thereof connected to the $\overline{\text{block}}$ signal. Thus, while an interblock gap is being read, the J input sets flipflop 360 causing the Q output thereof to generate a $\overline{\text{POST DET}}$ signal indicating that a postamble is not beneath the read head. As a block of information is encountered and the $\overline{\text{block}}$ signal goes false, the flip-flop 360 is not continuously set at each update sampling interval, but remains set until an AND gate 362 which drives the K input to flip-flop 360 becomes fully enabled. AND gate 362 becomes enabled when the DE3 signal indicates that the normal reading of data is occurring, when the data input ready shift signal DIRS indicates that a byte of data is available for outputting from the deskew register 252, and when a postamble signal POST indicates that a multiplex postamble signal was generated for each channel during a preceding sampling cycle.

The POST signal is generated by a postamble flip-flop 366 which is clocked by the clock input data signal CID at each data sampling interval and has the J input thereof driven by the complement of the multiplex postamble signal, $\overline{POST(X)}$. Flip-flop 366 is reset at each update time to cause the Q output thereof to generate a postamble signal, POST. If during a subsequent multiplex sampling cycle, the postamble signal POST(X) is not generated on any channel, the complement thereof drives flip-flop 366 to the set state to terminate the output signal POST. Thus, the signal POST is set at the beginning of a sampling cycle and remains set only if the multiplex postamble signal is generated for each channel during a subsequent sampling cycle.

A data input ready flip-flop 370 operates in a similar manner to determine whether data is ready for outputting on all operative channels during a multiplex sampling cycle. Flip-flop 370 is reset at update time to cause the $\overline{Q}$ output thereof to generate a true data input ready signal, DIR. Flip-flop 370 is clocked for each subsequent multiplex sampling interval and the J input thereto is driven by the complement of the multiplex data input ready signal, DIR($\overline{X}$). If any operative channel is not in condition to output data information from the deskew register 252, the $\overline{DIR(X)}$ signal goes true to set flip-flop 370 and terminate the data input ready signal DIR by the end of the multiplex sampling cycle. The data enabled signal DE3 is coupled to the complementing preset input of flip-flop 370 to constrain flip-flop 370 to the set state and prevent generation of the data input ready signal any time the data enable signal indicates that the read electronics 10 is not properly reading data.

In the event that signal DIR remains true at the end of a multiplex sampling cycle, a flip-flop 374 having the J input thereof responsive to signal DIR is clocked at update time and set to latch and hold the data input ready signal throughout a subsequent sampling cycle. A data input ready shift signal, DIRS, is generated by the Q output of flip-flop 374 to enable the shifting of a byte of data from the deskew register 252 to a 9 bit shift register 276 which performs a serial to parallel conversion when signal DIRS is true. Signal DIRS is coupled back to the K input of flip-flop 374, causing this flip-flop to reset at the update time following a multiplex sampling cycle during which data is output from the deskew register 252.

A zero flip-flop 378 is reset at update time to generate a true ZERO signal from the $\overline{Q}$ output thereof at the end of the subsequent multiplex sampling cycle if zeros are detected on all channels that are ready to output data information from the deskew register 252. The ZERO output signal at update time thus indicates that preamble or postamble all 0 information is in position for outputting from the deskew register 252. Flip-flop 378 is clocked at each multiplex sampling interval by clock input data signal CID and has the J input thereof responsive to an AND gate 380. AND gate 380 is activated in response to the concurrence of a logic one data signal as indicated by signal RDATA(X), the multiplex data input ready signal DIR(X), and the data detected signal 1NX6. Thus, in the event that a logic one is available for outputting on any operative channel, flip-flop 378 is set during the course of a sampling cycle and the ZERO output signal is terminated.

A postamble error detection flip-flop 382 is clocked at update time and generates a postamble error signal POST ERR at the Q output thereof. The $\overline{\text{block}}$ signal is coupled to the K input of flip-flop 382 to reset flip-flop 382 any time the reading of a block of information is not indicated. The J input to flip-flop 382 is driven in accordance with the logical function:

$$J = DIR \cdot (\overline{STR} + POST\ DET) \cdot (ZERO \oplus POST\ DET). \qquad (9)$$

This signal is generated to set flip-flop 382 at the end of an update cycle period during which it is determined that information is available for outputting from the deskew register 252 on all operative channels when either zeros are encountered on all channels in the absence of a single track error signal or when the postamble detected signal is true and zeros are not detected on all channels.

A multi-track error detected flip-flop 388 is clocked at update time and latches the multi-track error signal to inhibit the output of data information. Flip-flop 388 has the K input thereof coupled to the $\overline{\text{block}}$ signal causing the flip-flop to be reset each time an interblock gap is detected. The J input to flip-flop 388 is driven by an AND gate 390 which is activated in response to the concurrence of a $\overline{\text{POST DET}}$ signal, the data enable signal DE3, and the multi-track error signal MTR. Thus, any time a multiple track error is encountered during the normal reading of data information, flip-flop 388 is set and generates the multiple track error latch signal MTRK at the Q output thereof to inhibit further outputting of information.

A single track error latch flip-flop 392 is clocked at update time and latches a single track error indication. A single track error detected signal STRK is generated by the Q output of flip-flop 392. The $\overline{\text{BLOCK}}$ signal drives the K input of flip-flop 392 to reset the flip-flop at each interblock gap. The J input is responsive to an AND gate 394 which is enabled by the single track error signal STR, the data enabled signal DE3, and the $\overline{\text{POST DET}}$ signal. Signal STRK is thus generated whenever a single track error is countered during the normal leading of data information.

A NAND gate 396 receives the $\overline{\text{BLOCK}}$ signal directly and the BLOCK signal through a low pass filter. The output is inverted by an inverter 398 to generate a short BLOCK TERMINATED pulse at the end of each block of information when the block signal goes false and the $\overline{\text{block}}$ signal goes true.

A 9 bit serial in and parallel out shift register 376 receives a serial 9 bit byte of data information during a multiplex sampling cycle and outputs the data information simultaneously in parallel at the end of the sampling cycle. A complementing clear input to register 376 is coupled to the data enabled signal DE3 to constrain the register 376 to a clear condition in the event that signal DE3 indicates that the reading of data has not been enabled. A clock input to register 376 is generated by the output of a NAND gate 410 which passes the clock input data signal CID when enabled by the DIRS output of flip-flop 374. A D input to register 376 is driven by an AND gate 412 which passes the multiplex serial data signal RDATA(X) when enabled by the output of a NAND gate 414. Under normal conditions, an $\overline{X6}$ signal input to NAND gate 414 is at logic 0 to indicate that a sampled channel is active with error free data having been detected thereon to drive the output of NAND gate 414 high and enable AND gate 412 to pass the serial data signal RDATA(X). A flip-flop 416 is clocked at the update interval preceding a data output multiplex cycle to load the vertical redundancy check character from parity flip-flop 342. In the event that a single track error condition exists, the Q output of flip-flop 416 indicates the complement of the data state information which should be supplied on the channel in error to provide odd parity over the entire byte of data which is being output. When the channel which is in error is encountered during a multiplex cycle in which data is being output, the serial data signal RDATA(X) is forced to logic 1 to make an AND gate 412 responsive to the output of NAND gate 414. The $\overline{X6}$ input to NAND gate 414 enables that gate to pass the complement of the Q output of flip-flop 416. This is precisely the data state information which is required to correctly fill in data on the channel in error and is provided at the D input to register 376 at the multiplex sampling time for the channel in error. A shift register loaded clock signal 420 is generated by a NAND gate 422 and inverter 424. One input to NAND gate 422 is driven by the DIRS signal output from flip-flop 374 through a low pass filter having a relatively low cut off frequency formed by a 470 ohm resistor 426 and a 1,000 pf capacitor 428. The other input to NAND gate 422 is driven by the $\overline{DIRS}$ signal from the $\overline{Q}$ output of flip-flop 374 through a low pass filter having a relatively high cut off frequency and formed by a 470 ohm resistor 430 and a 100 microfarad capacitor 432. Because of the difference in cut off frequencies of the two low pass filters, an output pulse is generated as flip-flop 374 is toggled from the set to the reset state at the end of a sampling cycle in which data information is shifted into register 376, but is not generated by the setting of flip-flop 374 to enable the outputting of data to register 376 during a subsequent sampling cycle. The output clock pulse is inverted by a NAND gate 440 which generates a short duration read clock pulse output RCLOCK in response to the output clock signal 420 when fully enabled by the complements of four error signals. These error signals include the multi-track error detected signal $\overline{MTRK}$, the parity error signal $\overline{VCR\ ERR}$, the postamble error signal $\overline{POST\ ERR}$, and the postamble detected signal $\overline{POST\ DET}$. The postamble detected signal is not really an error signal but prevents the outputting of information from the postamble of a block of information.

The outputting of information from the deskew register 252 actually requires two multiplex sampling cycles and may be briefly summarized as follows. During the first multiplex sampling cycle, the multiplex data input ready signal DIR(X) is generated for all operative channels and results in the data input ready shift flip-flop 374 being set at the end of the first multiplex sampling cycle. The setting of this flip-flop enables the serial loading of register 376 during the subsequent second multiplex sampling cycle. At the end of the second sampling cycle after register 376 has been loaded with a nine bit byte of data, flip-flop 374 is reset to cause the generation of a short duration read clock pulse if NAND gate 440 is enabled by the absence of an error signal or a postamble detected signal.

While there has been shown and described above a particular example of a partially time multiplexed data read circuit in accordance with the invention for the purpose of enabling a person of ordinary skill in the art to make and use the invention, it will be appreciated that the invention is not limited thereto. Accordingly any modifications, variations or equivalent arrangements within the scope of the attached claims should be considered to be within the scope of the invention.

What is claimed is:

1. A system for simultaneously reading information from a plurality of information tracks which are recorded in a self-clocking data format, the system comprising:

a plurality of first subsystems, each being responsive to information recorded on a different track and each including:

circuitry connected to detect and indicate an information state transition of recorded information;

circuitry connected to sense and indicate a current information state of recorded information; and circuitry connected to indicate elapsed time since a most recent information state transition; and a second subsystem connected to periodically and sequentially sample information indicated by each of the first subsystems and generate data signals indicative of data information recorded on a plurality of tracks in response thereto.

2. The system according to claim 1 above, wherein the second subsystem is adapted to respond to information recorded in a format commonly known as phase encoding wherein information is recorded on each track in a succession of data frames with a data transition occurring at a boundary between each adjacent data frame of a polarity which is indicative of recorded data information and a phase transition occurs nominally midway between two successive data transitions of the same polarity.

3. The system according to claim 1 wherein the first subsystems are each sampled data subsystems which are connected to sample information states which are reproduced from recorded information in response to successive master clock pulse signals which occur at a rate of at least 10 master clock pulses for each data information transition of recorded information.

4. The system according to claim 3 above, wherein each first subsystem includes a transition detection circuit including a flip-flop which is set to one state each time an information transition is detected and reset to an opposite state each time a one state thereof is detected by the second subsystem.

5. The system according to claim 4 above, wherein each first subsystem includes a transition counter connected to count clock pulses which occur subsequent to each information transition and a maximum count indicator connected to indicate a maximum count reached by the transition counter with a resolution sufficient to permit time periods of 1/4 the nominal time between successive data transitions to be distinguished, the output of the maximum count indicator being sampled as an indication of elapsed time since an information transition by the second subsystem and the maximum count indicator being reset the first time the output thereof is sampled following a data information transition.

6. The system according to claim 5 above, wherein the second subsystem samples the indications provided by the first subsystems sufficiently fast that information indicating the time between successive information transitions is not lost.

7. The system according to claim 6 above, wherein the second subsystem samples the indications provided by each first subsystem at a rate at least four times the nominal rate of data information transitions.

8. The system according to claim 5 above, wherein the master clock pulses occur at a rate of approximately 64 times the nominal rate of data information transitions and wherein the second subsystem samples information indicated by each first subsystem at a rate of approximately 6.4 times the nominal rate of the data information transitions.

9. The system according to claim 3 above, further comprising a master clock pulse generator generating a master clock pulse signal for the system and wherein all of the first subsystems are responsive to the same master clock pulse signal.

10. The system according to claim 9 above, wherein the master clock pulse generator is responsive to the rate at which data information transitions are actually detected by a first subsystem and operates to provide a predetermined number of master clock pulses for each data information transition.

11. The system according to claim 9 above, wherein the master clock pulse generator is responsive to the period of time between a selected plurality of detected data information transitions to generate a desired average number of master clock pulses for each data information transition over the selected plurality of detected data information transitions.

12. The system according to claim 1 above, wherein the second subsystem includes error detection circuitry responsive to the indicated elapsed time which generates an error signal in the event that a data transition does not occur between 3/4 and 5/4 of the nominal data information transition time period.

13. The system according to claim 12 wherein the error detection circuitry further generates an error signal in the event that two successive information transitions are not separated by at least 1/4 of a nominal data information transition time period.

14. The system according to claim 13 above, wherein the second subsystem includes circuitry for detecting and indicating a data information transition whenever an information transition occurs between 3/4 and 5/4 of a nominal data information time period.

15. The system according to claim 13 above, wherein the second subsystem stores information indicative of the data state indicated by the immediately preceding data information transition and stores information indicative of whether or not the immediately preceding information transition was a phase information transition and wherein the error detection circuitry generates an error signal in response to the indication of a data information transition when the logical function "previous data state ⊕ preceding phase transition ⊕ current data state" is false.

16. The system according to claim 15 above, wherein the second subsystem further includes means responsive to the generation of an error signal in response to the sampling of indications from a first subsystem for inhibiting the generation of data signals in response to information indicated by a first subsystem for which a preceding error signal has been generated during the reading of a block of data information.

17. The system according to claim 16 above, wherein the second subsystem further includes means for generating data signals indicative of data information recorded on a plurality of tracks in response to data state information derived from uninhibited first subsystems when response to a first subsystem has been inhibited.

18. The system according to claim 17 above, wherein the second subsystem further includes means for inhibiting further operation of the system in response to the generation of error signals in response to the sampling of indications provided by two different first subsystems.

19. The system according to claim 1 above, wherein the format in which the information is recorded requires that information be recorded in blocks with each block including a preamble including at least three second polarity data information transitions on all tracks followed by one first polarity data information transition on all tracks and a postamble including a first polarity data information transitions on all tracks followed by at least three second polarity data information transitions on all tracks and wherein the second subsystem includes data detection circuitry responsive to indications provided by sampled first subsystems which indicates the occurrence and polarity of a data information transition and shifting storage for each first subsystem for receiving data information transition polarity information at an input storage position with previously stored polarity information being shifted away from the input position as new polarity information is entered into the storage.

20. The system according to claim 19 above, wherein the second subsystem further includes output circuitry responsive to the contents of the shifting storage, the output circuitry sensing an output storage condition wherein a first polarity information is stored at least three shift positions beyond the input position for each operative first subsystem, the output circuitry outputting polarity information from a storage position immediately adjacent the farthest most first polarity information on the input side and shifting the farthest most first polarity information to the adjacent output position for each operative first subsystem in response to the sensing of an output storage condition.

21. The system according to claim 20 above, wherein the second subsystem further includes circuitry for sensing the presence of second polarity information in at least three storage positions immediately preceding the storage position storing the farthest most first polarity information for each operative first subsystem and inhibiting the output of data information from the system in response thereto.

22. The system according to claim 20 above wherein the second subsystem further includes overflow circuitry connected to sense the overflow of polarity information from shifting storage for an operative first subsystem and inhibit the output of data information from the system in response thereto.

23. A multichannel, partly time multiplexed system for reading information from a plurality of prerecorded tracks, each being associated with a different channel, the system comprising:

a plurality of first subsystems, each being associated with a different channel and being responsive to information recorded on a track to indicate a current information state, each occurrence of an information state transition and a time since the latest information state transition;

time multiplexing data detection circuitry operating to periodically and sequentially sample the indications from each of the first subsystems and generate data information in response thereto; and deskewing circuitry connected to receive data information as it is generated by the detection circuit and output received data information for a plurality of channels simultaneously.

24. A deskew circuit for receiving blocks of data information for a plurality of channels at different times and outputting data information for all of the plurality of channels simultaneously, the deskew circuit comprising:

a plurality of multiple storage position shift registers, each being associated with a different channel and receiving data information at a storage position adjacent an input end with stored information being shifted, one position away from the input end as new information is received;

means for storing a first information state in the storage position adjacent an input end and a different information state in all other storage positions for each shift register; and means for simultaneously outputting data information stored by a position adjacent a farthest position from an input end which stores a first information state in each shift register; and means for storing a first information state in the storage position from which output data information is taken and storing a different information state in the storage position immediately there beyond for each shift register.

25. The method of deskewing data information which is received in a plurality of channels in a block format requiring that a block of data information be preceded by a plurality of second bits and then a single first bit on each channel, the method comprising the steps of:

entering information received for each channel into a shift register associated with that channel at an input end thereof with the immediately preceding contents of the register being shifted away from the input end;

detecting the location of the first bit which is farthest from the input end of each shift register;

determining an output condition wherein the farthest first bit of each register is located at least one position away from the input end; and outputting data information in response to a determination of an output condition by:

writing a bit located adjacent a farthest one bit on the input side for each shift register into a corresponding bit position of an output register, and shifting the location of the farthest first bit one position toward the input.

26. A system for reading information recorded on multiple parallel tracks in a phase encoding format wherein a data information state is indicated by a polarity of a data information transition which occurs at the end of a data frame interval and a phase information transition may occur at a midpoint of a data frame interval, the system comprising:

a master clock signal generator connected to respond to a first track of recorded information and generate a master clock signal with the frequency being adjusted in accordance with the rate at which data information appears on the first track to generate a predetermined number of master clock pulses between successive data information transitions, said rate being an average rate over a plurality of data frame intervals; and means for detecting information recorded on each channel in a phase encoded format using said master clock pulses as a master time reference to detect error free data information transitions on all channels.

27. The system according to claim 26 above, wherein the frequency of the master clock pulses generated by the master clock signal generator is adjusted in accordance with the average rate at which data appears on the first track over approximately five consecutive data frame intervals.

28. A system for reading multichannel recorded information from magnetic tape comprising:

a plurality of data gathering subsystems, each being associated with a different channel of recorded information and being operative to indicate for the associated channel the occurrence of an information transition, the information state of a latest information state transition and the elapsed time since a latest information state transition; and a single data processing subsystem operating on a time multiplex basis to periodically and sequentially sample the indications for each channel provided by the data gathering subsystem to detect error free data information transitions therefor and output data information indicative of information recorded on the magnetic tape.

29. The system according to claim 28 above, wherein the data processing system operates for each channel to establish the position of information transitions within nominal, expected data frame intervals between successive data information transitions and accept as data information transitions only transitions which occur within predetermined limits with respect to nominal data frame intervals.

30. The system according to claim 29 above, wherein said limits are 75% and 125% of a nominal data frame interval.

31. The system according to claim 30 above, wherein the data processing subsystem samples the indications for each channel approximately 6 times for each nominal data frame interval.

32. For use with a digital magnetic tape transport a data reader for reading phase encoded data having a predetermined data frame period from multiple recording channels of a magnetic tape which is moved by the tape transport, the data reader comprising:

a high speed sampling system for each channel of information recorded on a tape, each sampling system being responsive to the state of information which is sensed from a recorded channel to which the high speed sampling system is responsive to generate first output signals which are periodically updated at least 10 times during each data frame period, the first output signals including a state signal indicating a current information state, a timing signal indicative of a period of elapsed time since a preceding information state transition and a transition signal which is set in response to a data state transition;

a low speed sampling system for sampling the first output signals of each channel in sequence with the outputs of each channel being sampled at least twice during each data frame period and sufficiently often that elapsed time information provided by the timing signal is unambiguous, the low speed sampling system being connected to reset a sampled transition signal, operate in response to sample timing signals to maintain an indication of elapsed time since a preceding data information state transition for each channel, operate in response to transition signals and elapsed time indications for each channel to distinguish data transitions and generate data transition signals in response thereto, and operate in response to transition state signals to generate a data information state signal indicative of a data state represented by a data state transition concurrently with the generation of each data state transition signal; and deskew circuitry responsive to the data state transition signals and data information state signals to collect data information for each channel and output said collected information in parallel.

33. For use in a partially time multiplexed system for reading information recorded in a self clocking format wherein the polarities of transitions and the times between recorded transitions are utilized to derive data from recorded information at least one subsystem which is associated with a given channel of recorded information, the subsystem comprising means for indicating recorded information states; means responsive to the indicating means for detecting changes in recorded information states and means responsive to the indicating means and the detecting means for determining elapsed time subsequent to a change in a recorded information state, the subsystem being operable to provide elapsed time and data state information to a sample data system to permit the sample data system to determine the elapsed time between successive changes in recorded information states with a resolution greater than the reciprocal of the rate at which the sample data system samples the subsystem.

* * * * *

UNITED STATES PATENT AND TRADEMARK OFFICE

CERTIFICATE OF CORRECTION

PATENT NO. : 3,921,212

DATED : November 18, 1975

INVENTOR(S) : Martin D. Gray

It is certified that error appears in the above-identified patent and that said Letters Patent are hereby corrected as shown below:

In the Abstract, line 15, after "transition" and before "Data", insert a period ("."). Col. 7, line 40, after "Signal" and before "goes", "X6" should read --$\overline{X6}$--. Col. 14, line 3, after "at" and before "1", "lofic" should read --logic--; line 39, after "The", "I1" should read --I0--. Col. 16, line 18, after "signal" and before "is" (first occurrence), "SS(X)" should read --$\overline{SS(X)}$--; line 22, after "signal" and before "goes", "SS(X)" should read --$\overline{SS(X)}$--; line 27, "Thc" should read --The--. Col. 20, line 53, "flipflop" should read --flip-flop--.

Signed and Sealed this

*twentieth* Day of *April 1976*

[SEAL]

*Attest:*

RUTH C. MASON
*Attesting Officer*

C. MARSHALL DANN
*Commissioner of Patents and Trademarks*